(12) United States Patent
Evans et al.

(10) Patent No.: US 11,372,169 B2
(45) Date of Patent: Jun. 28, 2022

(54) WAVEGUIDE SUBSTRATES AND WAVEGUIDE SUBSTRATE CONNECTOR ASSEMBLIES HAVING WAVEGUIDES AND ALIGNMENT FEATURES AND METHODS OF FABRICATING THE SAME

(71) Applicant: CORNING RESEARCH & DEVELOPMENT CORPORATION, Corning, NY (US)

(72) Inventors: Alan Frank Evans, Beaver Dams, NY (US); Micah Colen Isenhour, Lincolnton, NC (US); Christopher Paul Lewallen, Hudson, NC (US); James Scott Sutherland, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/030,808

(22) Filed: Sep. 24, 2020

(65) Prior Publication Data
US 2021/0018697 A1    Jan. 21, 2021

Related U.S. Application Data

(63) Continuation of application No. PCT/US2019/025294, filed on Apr. 2, 2019.
(Continued)

(51) Int. Cl.
*G02B 6/40* (2006.01)
*G02B 6/44* (2006.01)
*G02B 6/38* (2006.01)

(52) U.S. Cl.
CPC ......... *G02B 6/3825* (2013.01); *G02B 6/3881* (2013.01); *G02B 6/406* (2013.01); *G02B 6/4472* (2013.01)

(58) Field of Classification Search
None
See application file for complete search history.

(56) References Cited

U.S. PATENT DOCUMENTS

| 5,343,544 | A | 8/1994 | Boyd et al. |
| 6,619,853 | B2 * | 9/2003 | Grois ................... G02B 6/3887 385/59 |

(Continued)

FOREIGN PATENT DOCUMENTS

| CN | 1381736 A | 11/2002 |
| CN | 101576711 A | 11/2009 |

(Continued)

OTHER PUBLICATIONS

Commscope, "Fiber Indexing", available online at <https://web.archive.org/web/20170903124659if_/http://www.commscope.com/Solutions/Fiber-Indexing/>, 2017, 3 pages.

(Continued)

*Primary Examiner* — Rhonda S Peace
(74) *Attorney, Agent, or Firm* — Grant A. Gildehaus

(57) ABSTRACT

Waveguide substrates, waveguide substrate assemblies, and methods for fabricating waveguide substrates are disclosed. In one embodiment, a waveguide substrate includes an input edge, an output edge, and at least one waveguide within the waveguide substrate. The waveguide substrate further includes at least one input alignment feature within the input edge adjacent to the input end of the at least one waveguide, wherein the at least one input alignment feature is fabricated from a material of the waveguide substrate. The waveguide substrate may also include at least one output alignment feature within the input edge adjacent to the output end of the at least one waveguide, wherein the at least one output alignment feature is fabricated from the material of the waveguide substrate.

19 Claims, 29 Drawing Sheets

Related U.S. Application Data

(60) Provisional application No. 62/652,135, filed on Apr. 3, 2018.

(56) References Cited

U.S. PATENT DOCUMENTS

| | | | |
|---|---|---|---|
| 6,754,429 B2 | 6/2004 | Borrelli et al. | |
| 6,850,671 B2* | 2/2005 | Carnevale | G02B 6/4472 385/115 |
| 6,990,265 B2 | 1/2006 | Kubby et al. | |
| 8,270,784 B2 | 9/2012 | Thomson et al. | |
| 8,699,838 B2 | 4/2014 | Andrzejewski et al. | |
| 9,029,242 B2 | 5/2015 | Holden et al. | |
| 9,223,094 B2* | 12/2015 | Schneider | G02B 6/3885 |
| 9,348,096 B2 | 5/2016 | Parsons et al. | |
| 9,442,259 B2 | 9/2016 | Furuya | |
| 9,846,283 B2* | 12/2017 | Pepe | G02B 6/30 |
| 10,459,160 B2* | 10/2019 | Brusberg | H05K 1/0274 |
| 10,684,419 B2* | 6/2020 | Fortusini | G02B 6/13 |
| 2004/0240812 A1 | 12/2004 | Sun et al. | |
| 2004/0258359 A1 | 12/2004 | Corkum et al. | |
| 2013/0094801 A1* | 4/2013 | Morris | G02B 6/30 385/14 |
| 2014/0294339 A1* | 10/2014 | Lagziel | G02B 6/3825 385/14 |
| 2015/0166396 A1 | 6/2015 | Marjanovic et al. | |
| 2015/0261261 A1 | 9/2015 | Bhagavatula et al. | |
| 2016/0025942 A1* | 1/2016 | Pepe | G02B 6/3893 385/24 |
| 2016/0199944 A1 | 7/2016 | Hosseini | |
| 2017/0059781 A1 | 3/2017 | Fortusini et al. | |
| 2017/0146751 A1 | 5/2017 | Sutherland | |
| 2019/0302371 A1* | 10/2019 | Van Wuijckhuijse | G02B 6/3801 |
| 2020/0241220 A1 | 7/2020 | Evans | |

FOREIGN PATENT DOCUMENTS

| | | |
|---|---|---|
| CN | 102958642 A | 3/2013 |
| CN | 102971838 A | 3/2013 |
| CN | 103018799 A | 4/2013 |
| CN | 105246850 A | 1/2016 |
| CN | 105618936 A | 6/2016 |
| EP | 1162484 A2 | 12/2001 |
| EP | 3077150 A1 | 10/2016 |
| JP | 04-284406 A | 10/1992 |
| JP | 09-311237 A | 12/1997 |
| JP | 2002-267852 A | 9/2002 |
| WO | 2009/001969 A2 | 12/2008 |
| WO | 2012/023430 A1 | 2/2012 |
| WO | 2014/165175 A1 | 10/2014 |
| WO | 2015/081436 A1 | 6/2015 |
| WO | 2016/137488 A1 | 9/2016 |
| WO | 2017/046190 A2 | 3/2017 |

OTHER PUBLICATIONS

Corbari et al., "Femtosecond versus picosecond laser machining of nano-gratings and micro-channels in silica glass", Optics Express, vol. 21, No. 4, 2013, pp. 3946-3958.

Fernández-Pradas et al., "Laser fabricated microchannels inside photostructurable glass-ceramic", Applied Surface Science, vol. 255, No. 10, 2009, pp. 5499-5502.

International Search Report and Written Opinion of the International Searching Authority; PCT/US2019/025294; dated Jun. 25, 2019; 12 Pages; European Patent Office.

International Search Report and Written Opinion of the International Searching Authority; PCT/US2019/025295; dated Jun. 26, 2019; 12 Pages; European Patent Office.

Karimelahi et al., "Rapid micromachining of high aspect ratio holes in fused silica glass by high repetition rate picosecond laser", Applied Physics A: Materials Science and Processing, vol. 114, 2013, pp. 91-111.

Optoscribe, "Fiber Coupled InterconneX (FCX™) For Photonic Integration", available online at <https://web.archive.org/web/20170509155220/http://www.optoscribe.com:80/products/fcx-fiber-coupled-interconnex/>, May 9, 2017, 2 pages.

* cited by examiner

WAVEGUIDE SUBSTRATES AND WAVEGUIDE SUBSTRATE CONNECTOR ASSEMBLIES HAVING WAVEGUIDES AND ALIGNMENT FEATURES AND METHODS OF FABRICATING THE SAME

PRIORITY APPLICATION

This application is a continuation of International Application No. PCT/US19/25294, filed on Apr. 2, 2019, which claims the benefit of priority to U.S. Application No. 62/652,135, filed on Apr. 3, 2018, both applications being incorporated herein by reference.

BACKGROUND

Field

The present disclosure generally relates to optical connections and, more particularly, waveguide substrates, waveguide substrate connector assemblies, and methods of fabricating waveguide substrates for providing optical connections between optical fibers of optical connectors.

Technical Background

In optical communication networks, optical fibers may be routed from a junction point toward a plurality of individual subscribers, such as residences, businesses and the like for directing optical signals to the desired location. Thus, an enclosure such as a module may be used to receive and house a plurality of optical fibers, and then provide a breakout of optical connections for routing individual optical fibers or pairs of toward different locations in the optical network such as toward individual subscribers or the like. As an example, a multi-fiber connector may be provided as an input to an enclosure, and a plurality of output optical connectors may also be provided at the output of the enclosure for breaking out the optical signals of the multi-fiber connector into the desired optical paths. The connectors disposed at the edges of the enclosures or module also allow the network operator the flexibility to make moves, adds or changes to the optical network as needed at a convenient access location in the optical network. The output optical connectors of the enclosure have fiber optic cables attached to the connectors of the enclosure so that the optical signals may be routed toward the desired locations in the optical network. Optical paths within the enclosure break-out and route the optical signals from the multi-fiber connector to the output connectors for providing optical signals to and from desired locations. Typically, the optical signals are routed within the enclosure by optical fibers, and adapters at opposite sides of the enclosure provide an interface for the connectors external to the enclosure. However, the management and organization of many optical fibers within the enclosure may be challenging and occupy limited space in an equipment room, data center or closure. Further, the enclosures or modules may be organized and housed in equipment racks that are also large and bulky.

SUMMARY

The waveguide substrate concepts disclosed herein may be used with any suitable wiring scheme. In one embodiment, a waveguide substrate includes an input edge, an output edge, and at least one waveguide within the waveguide substrate extending from the input edge to the output edge such that an input end of the at least one waveguide is at the input edge and an output end of the at least one waveguide is at the output edge. The waveguide substrate further includes at least one input alignment feature within the input edge adjacent to the input end of the at least one waveguide, wherein the at least one input alignment feature is fabricated from a material of the waveguide substrate. The waveguide substrate also includes at least one output alignment feature within the input edge adjacent to the output end of the at least one waveguide, wherein the at least one output alignment feature is fabricated from the material of the waveguide substrate.

In another embodiment, a waveguide connector assembly includes a waveguide substrate and a connector housing. The waveguide substrate includes an edge, at least one waveguide within the waveguide substrate and terminating at the edge, and at least one alignment feature within the edge adjacent to an end of the at least one waveguide, wherein the at least one alignment feature is fabricated from a material of the waveguide substrate. The connector housing is coupled to the edge of the waveguide substrate and includes an opening operable to receive an optical connector and at least one housing alignment feature within the connector housing. The at least one housing alignment feature is disposed within the at least one alignment feature at the edge of the waveguide substrate.

In yet another embodiment, a method of fabricating a waveguide substrate includes writing at least one waveguide within the waveguide substrate such that the at least one waveguide terminates at an edge of the waveguide substrate, and applying a laser beam to the edge of the waveguide substrate to damage a material of the waveguide substrate at one or more damaged regions. The method further includes applying an etching solution to the waveguide substrate. An etch rate at the one or more damaged regions is greater than an etch rate at non-damaged regions of the waveguide substrate. Application of the etching solution results in at least one alignment feature within the edge adjacent to an end of the at least one waveguide.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Figure 1:
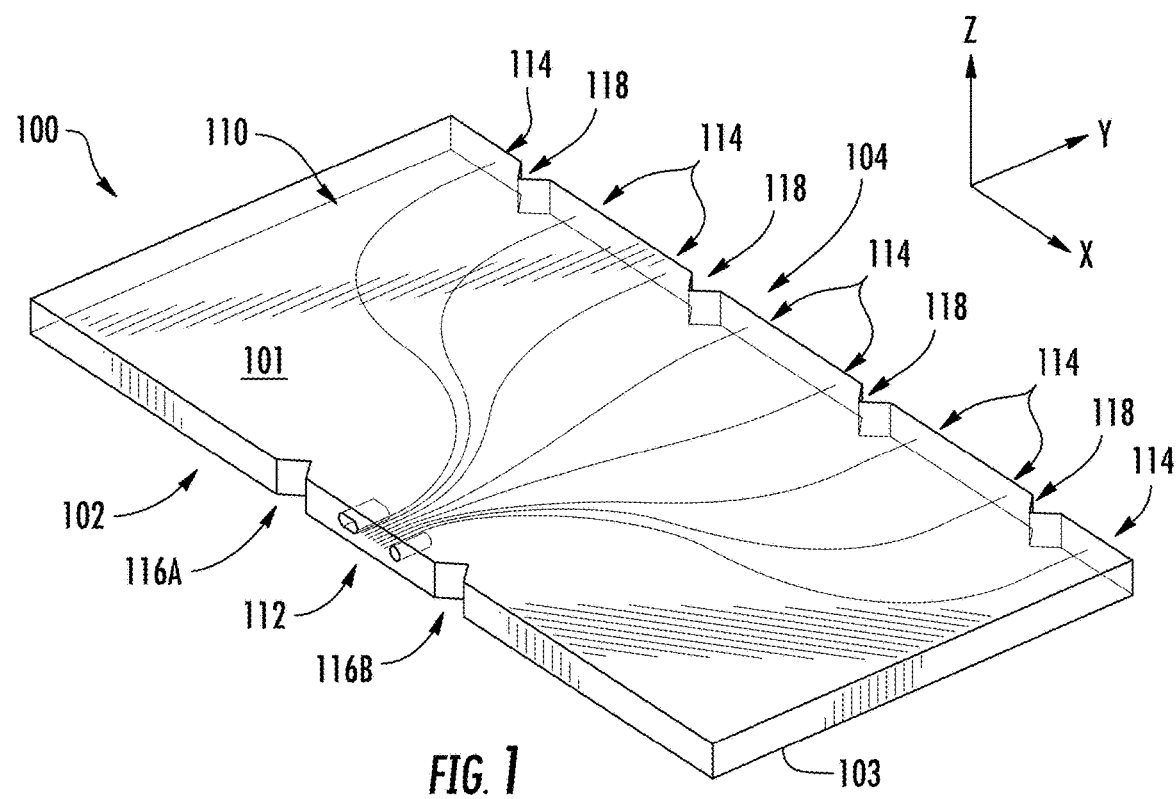
FIG. 1 schematically depicts a perspective view of an example waveguide substrate according to one or more embodiments described and illustrated herein.

Embodiments described herein are directed to waveguide substrates and waveguide substrate connector assemblies that route optical signals by a plurality of waveguides within the waveguide substrate. Optical communication networks are used to provide data to a plurality of subscribers. Optical fibers are thus routed to individual subscribers, such as businesses, residences, and the like. In some cases, optical fibers of a multi-fiber optical cable are individually routed toward individual subscribers. For instance, it may be desirable to break-out traffic from a multifiber optical cable into smaller subsets of one or more optical fibers for routing the optical signals toward the desired location in the optical network. Thus, means for routing optical signals of a multi-fiber optical connector between different, individual locations (e.g., individual subscribers) are desired. For example, individual optical fibers optically coupled to one or more multi-fiber optical connectors may be routed within a communication enclosure, and then routed to individual destinations from the enclosure. However, fiber-management of the many optical fibers within the enclosure may become unwieldy, and may require a large enclosure.

Embodiments of the present disclosure are directed to waveguide substrates and waveguide connector assemblies that include waveguides that may replace the optical fibers within the enclosure or module, thereby reducing the size and cost of the enclosure. The concepts disclosed herein may be used with waveguide substrates having any suitable wiring scheme. The concepts of waveguide substrates may be used as a replacement for the large and bulky modules or enclosures that physically route optical fibers within a box. The concepts disclosed are advantageous since they can take less space than conventional modules or enclosures, thereby improving density. Additionally, the waveguide substrates allow adaptability for moves, adds and changes to the optical network.

As a non-limiting example, the embodiments of the present disclosure enable the use of existing connectors while interfacing with a waveguide substrate having written waveguides within the waveguide substrate instead of using optical fibers. The module may serve any suitable function such as breaking-out optical signals in to smaller subset, "passing through" optical signals, or may serve as a shuffle, drop/add, receive-transmit arrangements, reorienting and redirecting waveguides into new arrangements, or for wavelength division multiplexing, etc. Other uses for the waveguide substrates described herein are possible.

The waveguides within the waveguide substrates described herein may be fabricated by a laser-writing process wherein a short-pulsed laser is used to create three dimensional waveguides within the material of the waveguide substrate (e.g., glass material). A short pulse (sub-picosecond) laser tightly focused into waveguide substrate changes the material structure and raises the refractive index. By controlling the laser position (e.g., via translation stages), these waveguides can be created anywhere with the waveguide substrate. Further, by controlling the laser power and scan speed, single mode waveguides of low optical loss are possible.

The waveguides may extend from one edge of the waveguide substrate to another. However, waveguides at the end of the waveguide substrate may necessitate effective interconnects to transfer a signal in a waveguide into an optical fiber where it may be routed to new destination. Embodiments of the present disclosure provide component parts and integral features for optically connecting waveguides to optical fibers within input and output optical connectors. One or more engagement and/or alignment features are provided on edges and/or surfaces of the waveguide substrate that mate with corresponding engagement and/or alignment features of one or more optical connectors.

Alignment features on the glass sheet may include coarse alignment features and fine alignment features, both cooperating to allow a passive alignment of, for example, an LC connector and an MT-style connector to an edge of the waveguide substrate. Such coarse alignment features may include, but are not limited to, cuts in the shape of a "V" that extend from a top surface to a bottom surface of the waveguide, effectively "notching" the edge of the waveguide substrate and creating a suitable indentation. Corresponding features on a connector housing engage the coarse alignment features to bring engagement paths for a fiber optic connector to within axial proximity of the waveguides of the waveguide substrate. Pin bores and other features may also be fabricated on the edges of the waveguide substrate. "Float," or rather built-in freedom of movement, allows for fine alignment as in the manner of mating two optical connectors, e.g., guide pins and split sleeves.

These alignment and/or engagement features may be fabricated into the waveguide substrates described herein by a laser-damage-and-etch process. When the laser power is increased, the material (e.g., glass) of the waveguide substrate becomes damaged such that subsequent exposure to chemical etchant causes a high selective anisotropic etching in the regions exposed to the laser. Because the etch rate of the material is higher at the regions damaged by the laser than regions not damaged by the laser, this process may be used to create alignment and/or engagement features for attaching fibers.

In some embodiments, the laser source used to fabricate the waveguides of the waveguide substrate is the same laser source that is used to fabricate the alignment and/or engagement features by the laser-damage-and-etch process. This allows for precise alignment between the ends of the waveguides at the edges of the waveguide substrate and the alignment and/or engagement features. For example, the waveguides may be first written into the waveguide substrate. These waveguides may be used as one or more reference fiducials in damaging the material of the waveguide substrate to fabricate the alignment and/or engagement features. Alternatively, the waveguide substrate may first be laser-damaged to form the alignment and/or engagement features, and the waveguides may be laser-written using one or more of the alignment and/or engagement features as one or more alignment fiducials. The precise alignment between the waveguides and the alignment and/or engagement features of the waveguide substrate provide for precise alignment between the waveguides and the optical fibers of the optical connectors optically coupled to the waveguide substrate.

Referring now to FIG. 1, a non-limiting example of a waveguide substrate 100 including a plurality of waveguides 110 is schematically depicted. The waveguide substrate 100 may be fabricated from any suitable material, such as glass, sapphire and semiconductor materials such as silicon. The waveguide substrate 100 has an input edge 102, an output edge 104, a first surface 101 and a second surface 103. This example depicts a break-out of waveguides from a larger grouping such as 8, 12, 24, 36, 48, etc. waveguides at the input to small subsets such as 2, 4, 8, 12, etc. at the output. The break-out of optical signals from a large connection point to smaller connection points allows the routing of optical signals toward different locations in the optical network.

The example waveguide substrate 100 has eight waveguides 110, although any number of waveguides may be provided in one or multi-dimensional arrays. Each waveguide 110 is defined by a line on or within the waveguide substrate 100 having a refractive index that is different from the material outside of the waveguide 110 such that light is maintained within the waveguide 110 when propagating through the waveguide substrate 100. Any known or yet-to-be-developed methods of writing waveguides 110 into the waveguide substrate may be utilized. For example, an ion-exchange process may be used to write the plurality of waveguides 110 by using a mask to change the refractive index of the material along lines defining the desired plurality of waveguides. As another example, a pulsed laser may be applied to apply two-dimensional or three-dimensional waveguides within a bulk of the waveguide substrate 100.

In the illustrated example, input ends of the plurality of waveguides 110 are relatively closely spaced (i.e., have a small pitch) at an input 112 on the input edge, and fan out to be relatively largely spaced (i.e., have a large pitch) at outputs 114. As a non-limiting example, and described in detail below, the input 112 may be configured to receive a MTP or MTO connector, while the outputs 114 may be configured to receive multiple SC or LC connectors. In the non-limiting example of FIG. 1, pairs of outputs 114 may be configured to receive a LC connector, as described in more detail below.

As shown in FIG. 1, the input edge 102 of the waveguide substrate 100 may include one or more input alignment features, such as first input alignment feature 116A and second input alignment feature 116B disposed on opposite sides of the input 112. The first input alignment feature 116A and the second input alignment feature 116B are configured as vertical notches within the input edge 102. As a non-limiting example, the notches may be configured as v-grooves. The vertical notches extend between the first surface 101 and the second surface 103 of the waveguide substrate. As used herein, "vertical" means along the illustrated z-axis (i.e., between and orthogonal to the first surface 101 and the second surface 103. The input alignment features are configured to receive corresponding connector alignment features of a connector housing (described in more detail below) to provide coarse alignment between the connector housing and the waveguide substrate 100. The v-grooves should have equal lengths on each side to enable self-centering of a corresponding connector alignment feature disposed therein.

The output edge 104 also includes a plurality of output alignment features 118 operable to receive a corresponding plurality of connector output alignment features. The output alignment features 118 provide for alignment of one or more output connector housings with respect to the outputs 114 of the plurality of waveguides 110. The output alignment features 118 may also be configured as notches, such as v-grooves.

The input alignment features (e.g., the first input alignment feature 116A and the second input alignment feature 116B) and the output alignment features 118 may be fabricated by a laser damage and etch process. A pulsed laser beam may be applied to regions of the input edge 102 and the output edge 104 at the desired locations of the alignment features. The pulsed laser beam modifies the material of the waveguide substrate 100. The waveguide substrate 100 is then subjected to an etching solution to etch away the damaged regions to form the desired alignment features, as well as other features described below. The etch rate of the damaged regions is greater than the etch rate of the material outside of the damaged regions. Therefore, the etching solution forms the desired features of the waveguide substrate 100, such as the first input alignment feature 116A and the second input alignment feature 116B and the output alignment features 118, for example.

It may be desirable to use the same laser used to form the plurality of waveguides 110 as the desired features, such as the alignment features. In this manner, the alignment features may be precisely registered to the plurality of waveguides 110. For example, one or more waveguides 110 may be first written into the waveguide substrate 100 by a laser. Then, the same laser may be used to damage the waveguide substrate 100 in regions corresponding with desired alignment features by referencing one or more regions of the one or more waveguides 110 as alignment reference fiducials. Similarly, the damaged regions corresponding to the alignment features may be first formed by the laser and then used as one or more reference fiducials to write the one or more waveguides.

Figure 1A:
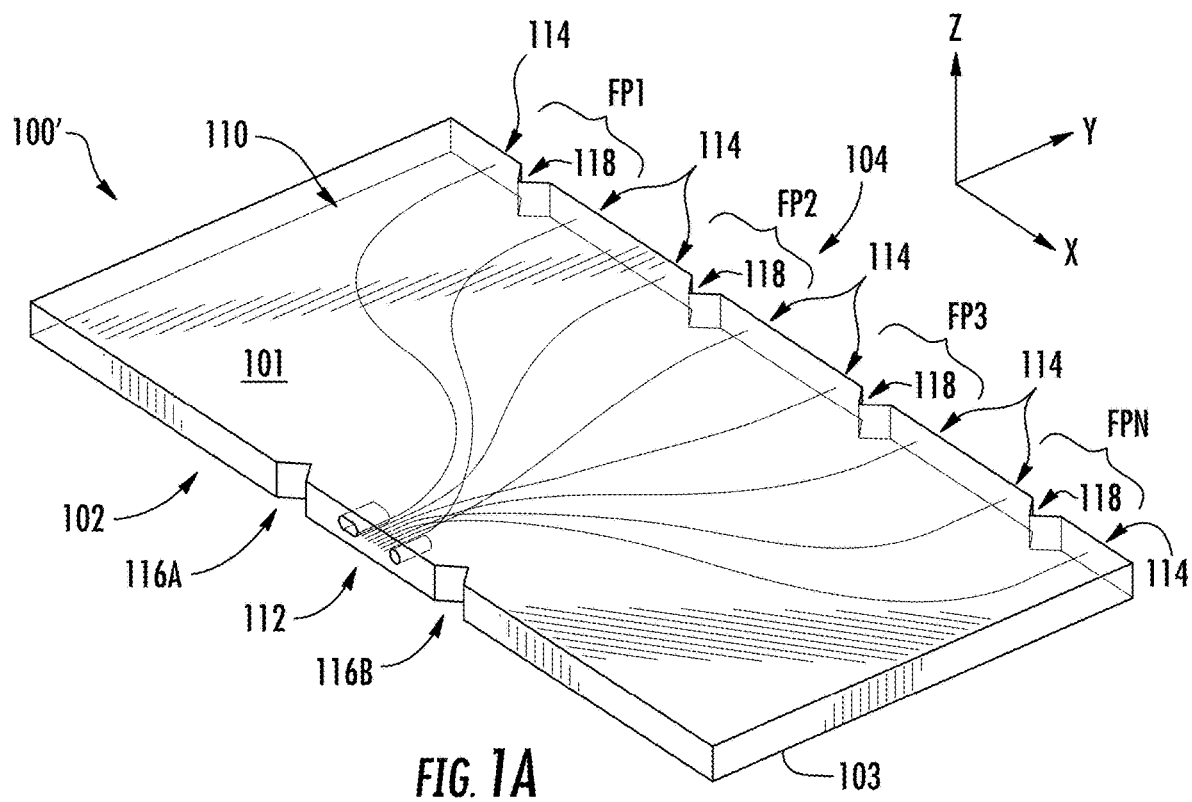
FIG. 1A schematically depicts a perspective view of another example waveguide substrate similar to FIG. 1 using a different wiring scheme according to one or more embodiments described and illustrated herein.

FIG. 1A depicts another example waveguide substrate 100' having eight waveguides 110 with a break-out wiring scheme similar to waveguide substrate 100. By way of explanation, there may be 8 inputs for a waveguide substrate that are grouped into 4-pairs of two outputs for duplex receive-transmit architectures; however, other pairings of receive-transmit input or outputs are possible such a 4-receive outputs and 4-transmit outputs broken-out from 8-inputs for parallel transmission architectures. Waveguide substrate 100' comprises pairs of waveguides FP1-FPN at the output 114 that use some non-adjacent waveguides for pairing (e.g., 1-8 pair, 2-7 pair, 3-6 pair, 4-5 pair). Where the waveguides in the waveguide substrate 100' are required to change position or cross-over other waveguides, then the waveguides may have a spaced-apart zone SZ as depicted in FIG. 2E for allowing the changing of waveguide positions without adverse cross-talk among waveguides.

Figure 2A:
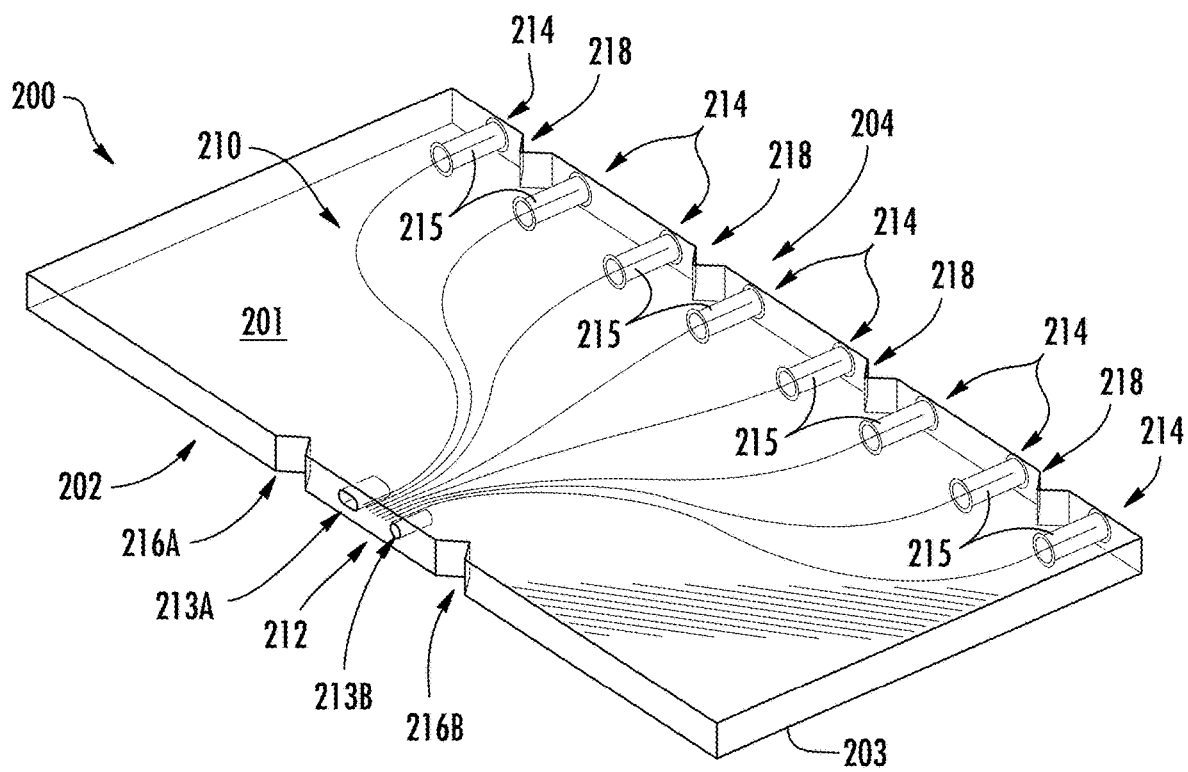
FIGS. 2A-2C schematically depict an example waveguide substrate according to one or more embodiments described and illustrated herein.
Figure 2B:
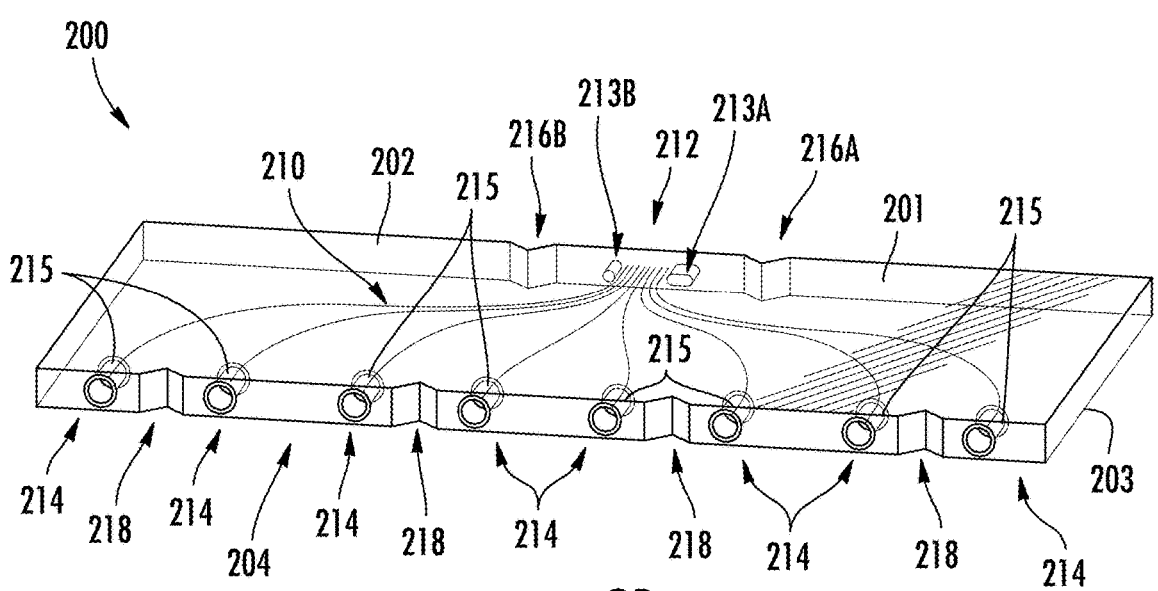
Figure 2C:
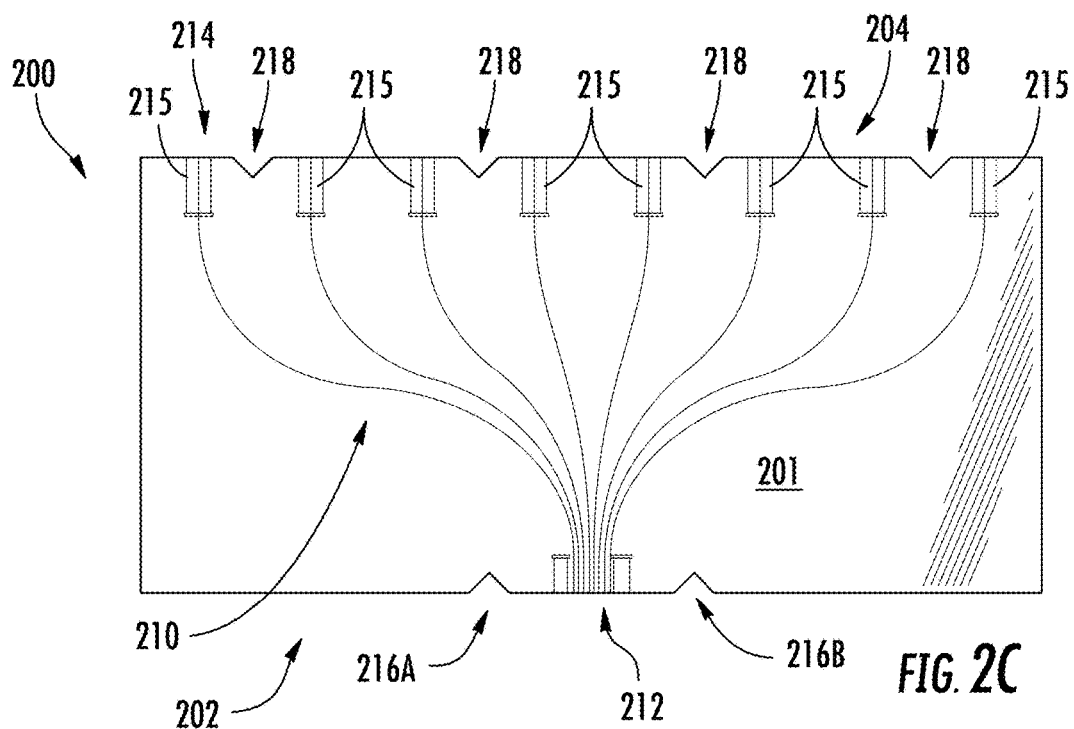

FIGS. 2A-2C schematically illustrate various views another example waveguide substrate 200 with additional features formed by the laser-damage-and-etch processes described herein. Referring first to FIG. 2A, the example waveguide substrate 200 has an input edge 202, an output edge 204, a first surface 201, and a second surface 203. A plurality of waveguide 210 are written into the waveguide substrate 200 extending from an input 212 at the input edge 202 to a plurality of outputs 214 at the output edge 204. The input edge 202 includes a first pin bore 213A and a second pin bore 213B operable to receive corresponding alignment pins or other features of an optical connector (not shown in FIGS. 2A-2C). In the illustrated example, the first pin bore 213A is configured as a slot, and the second pin bore 213B is configured as a cylindrical hole. Other shapes and combinations are also possible. The first pin bore 213A and the second pin bore 213B are operable to align optical fibers of the optical connector to the input ends of the plurality of waveguides 210 at the input edge. The first pin bore 213A and the second pin bore 213B may be fabricated by laser-damaging the input edge 202 of the waveguide substrate 200, and then removing the laser-damaged region by chemical etching, as described above.

The output edge 204 of the waveguide substrate 200 has a plurality of output alignment features 218 and a plurality of outputs 214 where output ends of the plurality of waveguides 210 are located. In the illustrated embodiment, a ring opening 215 is formed by a laser-damage-and-etch process around each waveguide 210 at the output edge 204. Each ring opening 215 is dimensioned to receive a component to facility mating with an optical connector (not shown). As an example, each ring opening 215 may be dimensioned to receive a sleeve, as described in more detail below. The ring opening 215 forms a central positive feature, which may act as a connector ferrule similar in shape and dimension to traditional connector ferrules, such as LC or SC connector ferrules. In a non-limiting example, the ring openings 215 have a pitch that emulates an LC duplex connector.

Figure 2D:
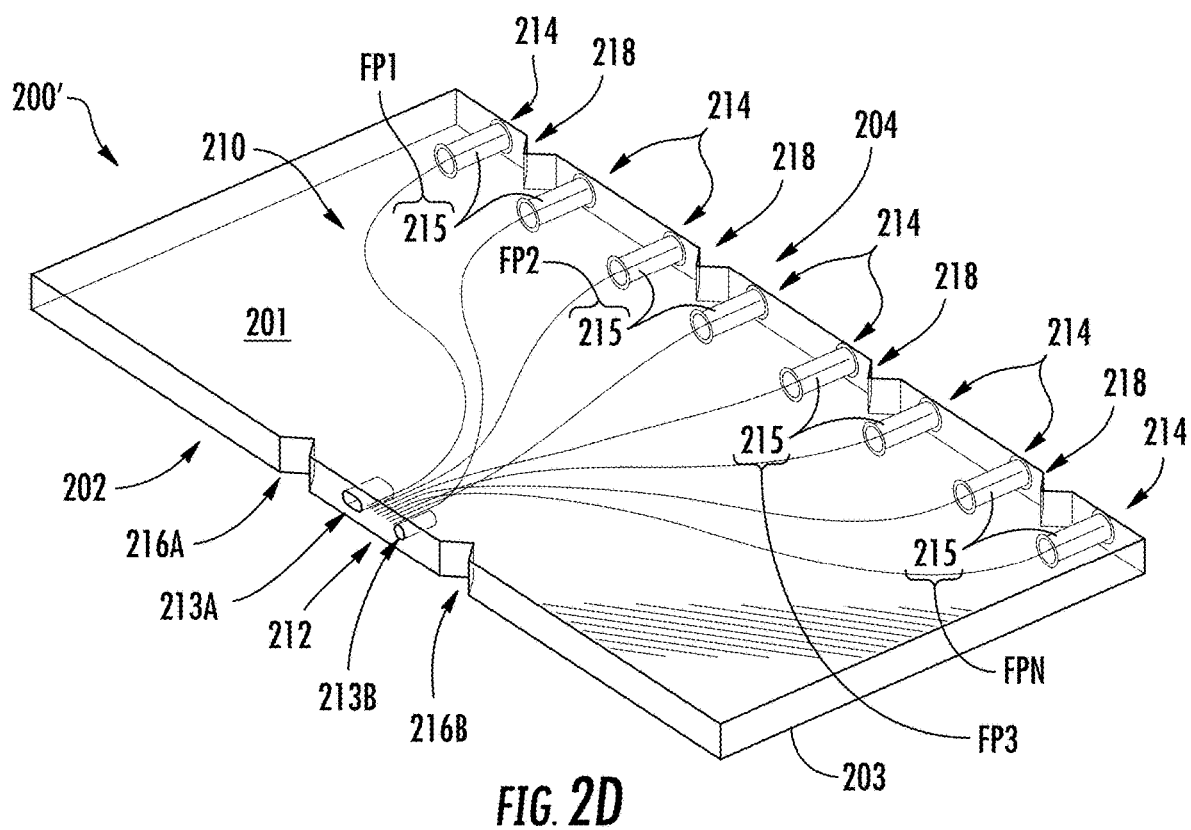
FIGS. 2D and 2E schematically depict the waveguide substrate of FIG. 1A with the wiring scheme having waveguides that change positions (e.g., cross over other waveguides) according to one or more embodiments described and illustrated herein.
Figure 2E:
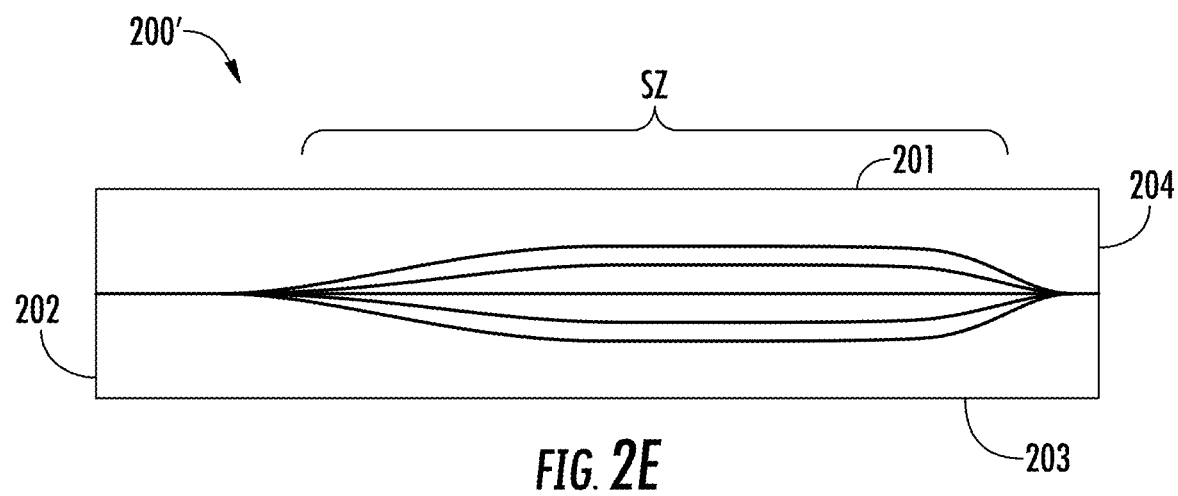

FIGS. 2D and 2E schematically depict the waveguide substrate 100' with the wiring scheme having waveguides that change positions, and is similar to waveguide substrate 100. Waveguide substrate 100' has outputs to the ring openings 215 are arranged as pairs FP1, FP2, FP3 and FPN as shown. Waveguide substrate 100' are shown as pairings of some non-adjacent pairs that have a spaced-apart zone SZ as schematically depicted in FIG. 2E. The spaced-apart zone SZ of the waveguides in waveguide substrate 100' avoid cross-talk among the waveguides. Once the change of position occurs the waveguides may be routed to a common plane at the output edge 204 or not. Although, waveguide substrate 100' depicts eight waveguides 110, any suitable number of waveguides may be provided with a suitable number of FPN pairs at the ring openings 215.

Figure 3A:
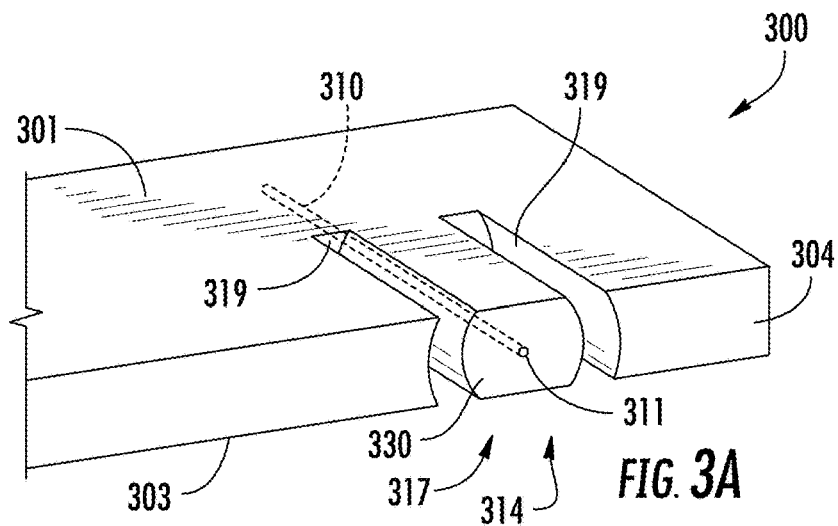
FIG. 3A schematically depicts a partial perspective view of an edge of an example waveguide substrate having an example connector ferrule according to one or more embodiments described and illustrated herein.

Referring now to FIG. 3A, a partial view of an example waveguide substrate 300 showing an individual output 314 is schematically illustrated. Two slit openings 319 (i.e., a first slit opening and a second slit opening) are formed by a laser-damage-and-etch process. The slit openings 319 extend through the waveguide substrate 300 from the first surface 301 to the second surface 303 and are adjacent to a waveguide 310 at the output edge 304. The two slit openings 319 are offset with respect to one another such that they define a connector ferrule 317 for mating with a corresponding connector ferrule of an optical connector (now shown). For example, the slit openings 319 may be curved such that the connector ferrule 317 has curves on its sides having a diameter corresponding to a desired ferrule (e.g., and LC ferrule). The slit openings 319 provide for a connector ferrule 317 that is not fully cylindrical in the illustrated embodiment. Rather, the connector ferrule 317 has planar surfaces defined by the first surface 301 and the second surface 303 of the waveguide substrate 300, for example.

As shown in FIG. 3A, a waveguide 310 is positioned within the connector ferrule 317. The waveguide 310 terminates at an optical coupling surface 330. In some embodiments, the optical coupling surface 330 may be within a same plane as the output edge 304. In other embodiments, the optical coupling surface 330 may be offset with respect to the output edge (e.g., recessed within the two slit openings 319).

Figure 3B:
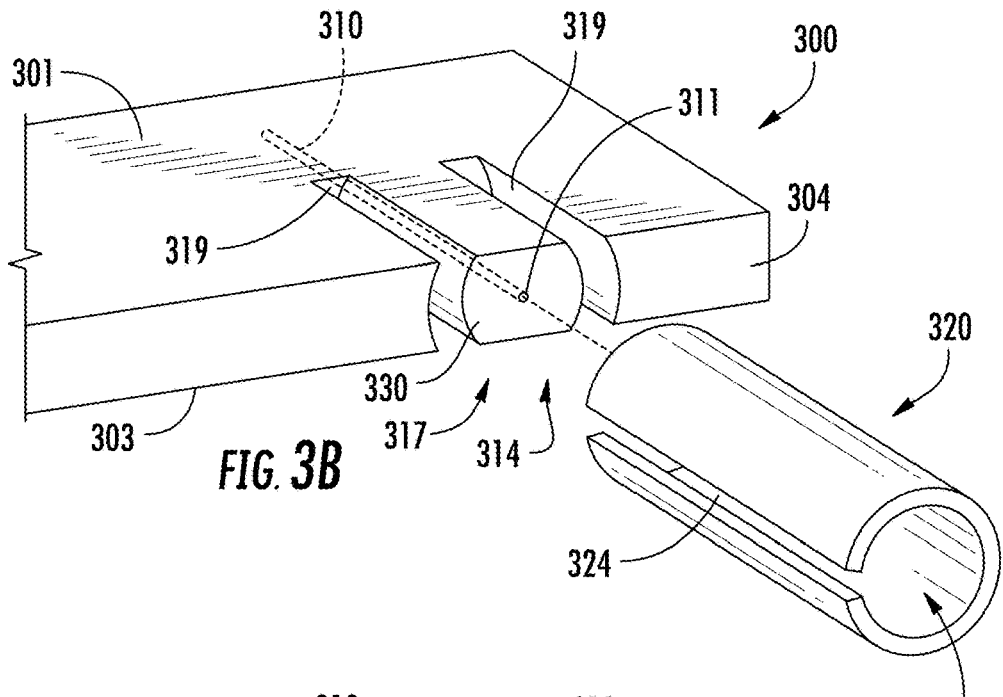
FIG. 3B schematically depicts the example waveguide substrate of FIG. 3A and an example sleeve in an unmated state according to one or more embodiments described and illustrated herein.
Figure 3C:
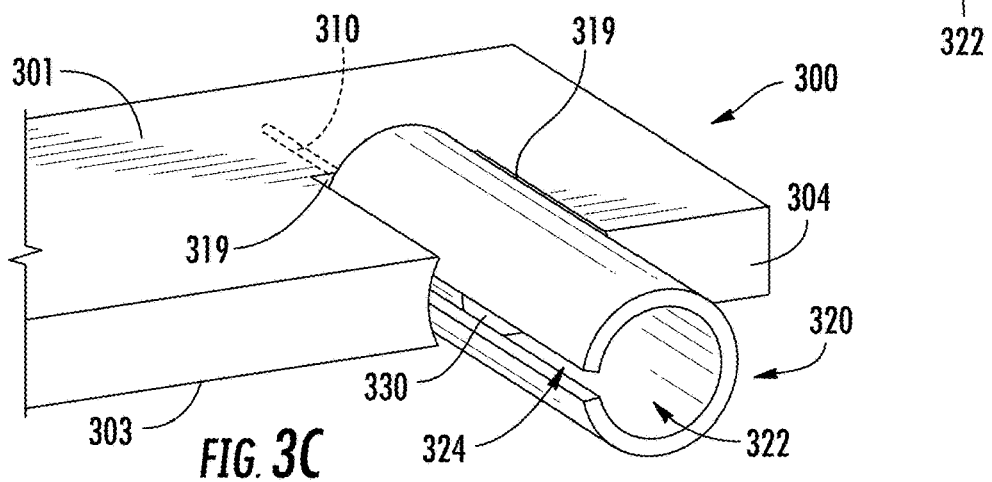
FIG. 3C schematically depicts the example waveguide substrate and example sleeve of FIG. 3B in a mated state according to one or more embodiments described and illustrated herein.

The two slit openings 319 may be configured to receive a sleeve that at least partially surrounds the connector ferrule 317. FIG. 3B illustrates the example waveguide substrate 300 shown in FIG. 3A as well as a sleeve 320 operable to be disposed around the connector ferrule 317. FIG. 3C illustrates the sleeve 320 disposed around the connector ferrule 317 of the waveguide substrate 300. The example sleeve 320 has a slit 324 along its length to allow the diameter of the internal passage 322 to enlarge such that the sleeve 320 may securely fit over the connector ferrule 317.

In FIGS. 3B and 3C, the slit 324 of the sleeve 320 is oriented to the left, but it may also be oriented upward, or possibly downward to improve ferrule-to-ferrule alignment and allow trapped debris to more easily be ejected from the sleeve 320. Sleeve 320 orientation can be maintained by adding a keying feature to the connector body (not shown) that will later be added to surround the connector ferrule 317. Alternatively, a keying feature can be integrated into the waveguide substrate by locating it within the annular ring defined by the two slits 319. In either case, the width of the keying feature should be smaller than the slit 324 of the sleeve 320 so that the inner diameter of the sleeve 320 is not altered when it engages the keying feature. The keying feature or the slit 324 may also include taper features that help rotate the sleeve 320 during installation to bring it to the desired orientation.

It is noted that the flat surfaces of the connector ferrule 317 provided by the first surface 301 and the second surface 303 provide large regions where debris trapped between ferrules (i.e., the connector ferrule 317 of the waveguide substrate 300 and the connector ferrule of the mated optical connector) within the sleeve 320 can collect during connector mating. This may help reduce the amount of debris that remains between the ferrule end faces after mating, thereby improving connector performance in the presence of dust and debris.

Figure 3D:
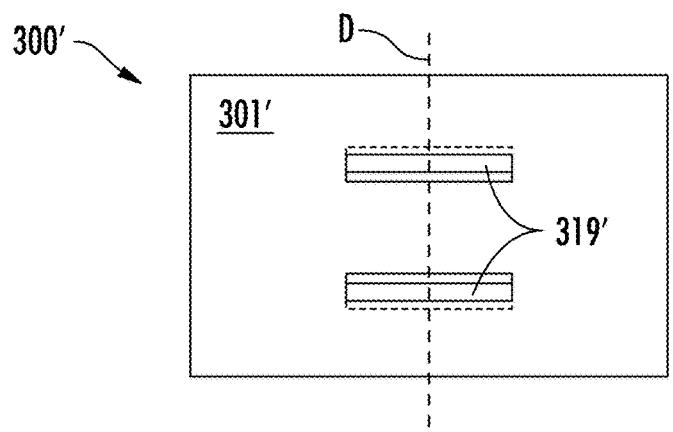
FIG. 3D schematically depicts a top view of an example mother waveguide substrate prior to dicing according to one or more embodiments described and illustrated herein.
Figure 3E:
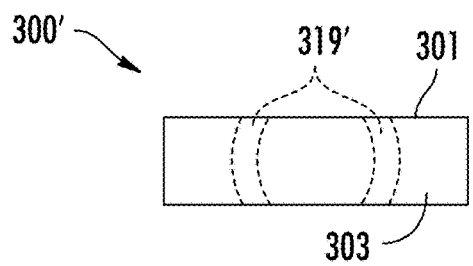
FIG. 3E schematically depicts a front view of an edge of the example mother waveguide substrate of FIG. 3D according to one or more embodiments described and illustrated herein.
Figure 3F:
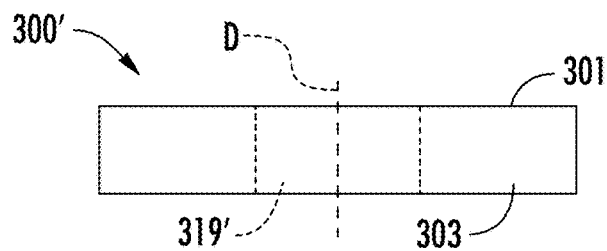
FIG. 3F schematically depicts a side view of the mother waveguide substrate of FIG. 3D according to one or more embodiments described and illustrated herein.

In an assembly process, many waveguide substrates with connector ferrules may be fabricated on a common substrate. FIGS. 3D-3F schematically illustrate various view of a partial mother waveguide substrate 300' from which two or more individual waveguide substrates 300 having connector ferrules may be fabricated. Any number of waveguide substrates 300 may be fabricated from a mother waveguide substrate 300'. In illustrated embodiment, a single laser exposure and etching process can create a pair of connector ferrules 317, where the connector ferrules are completed by dicing through the middle of the slit openings 319' as indicated by line D. This highlights an advantage of the current connector ferrule fabrication process, in that exposure and etching can both be carried out on wafer or panel scale. During the dicing process, the optical coupling surface 330 of the connector ferrule 317 can be polished to a smooth surface that is suitable for low-loss coupling, or a subsequent polish or etch step can be applied.

Figure 3G:
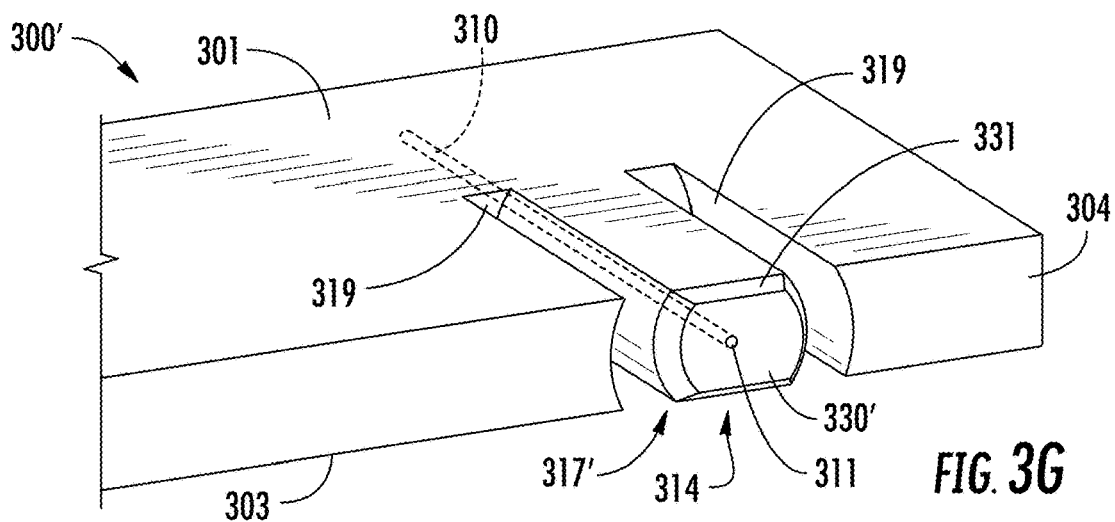
FIG. 3G schematically depicts a partial perspective view of an edge of an example waveguide substrate having an example connector ferrule with a chamfered edge according to one or more embodiments described and illustrated herein.

FIGS. 3G-3K schematically illustrate alternative configurations for the connector ferrule 317 shown in FIGS. 3A-3C. FIG. 3G illustrates a waveguide substrate 300' having a connector ferrule 317' having an optical coupling surface 330' with a chamfered edge 331 that simplifies sleeve 320 alignment to the connector ferrule 317'. As an example, and not a limitation, the laser exposure and etching process may be used to create the chamfered edges 331 around the ends of connector ferrules 317'. The chamfered edge 331 can also prevent chipping damage to the connector ferrule 317' during sleeve attachment. Similar chamfers can be added to edges around the outside of the annular ring defined by the slit openings 319 (not shown).

Figure 3H:
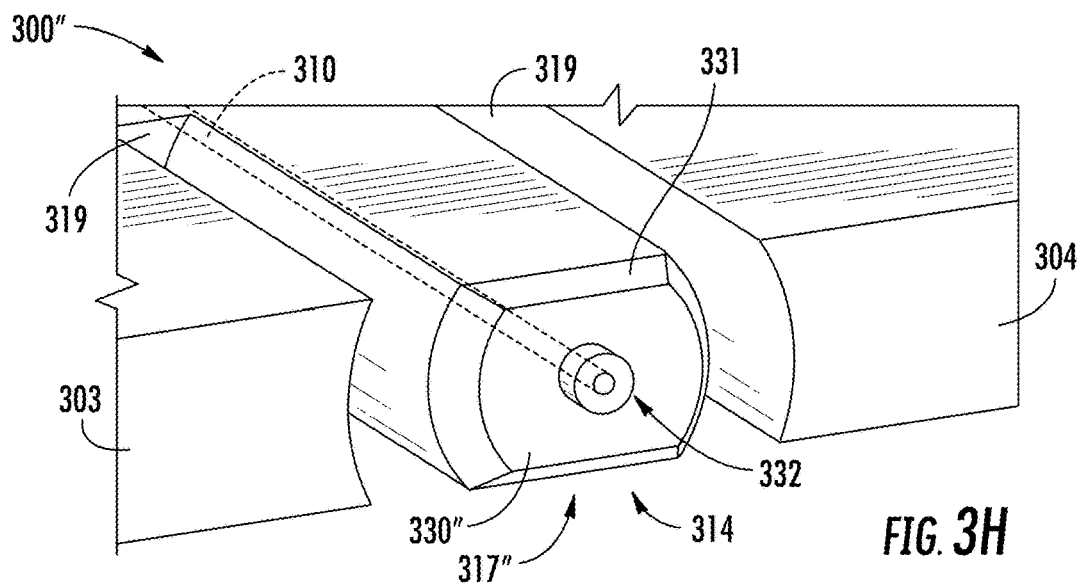
FIG. 3H schematically depicts a partial perspective view of an edge of an example waveguide substrate having an example connector ferrule with a chamfered edge and a raised feature according to one or more embodiments described and illustrated herein.

FIG. 3H schematically illustrates an example waveguide substrate 300" comprising a connector ferrule 317" having a chamfered edge 331 and a raised feature 332 extending from the optical coupling surface 330" and surrounding the output end of the waveguide 310. The raised feature 332 may also be created by the laser-damage-and-etch process. The raised feature 332 creates an open region around the waveguide 310 during mating that can receive dust and debris, preventing unwanted gaps and coupling loss that might otherwise occur.

Figure 3I:
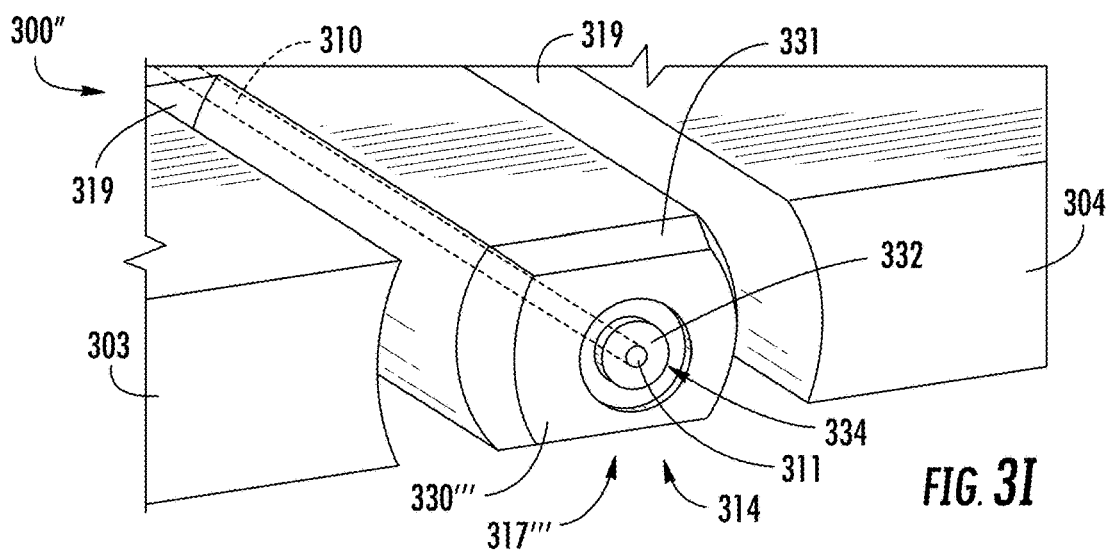
FIG. 3I schematically depicts a partial perspective view of an edge of an example waveguide substrate having an example connector ferrule with a chamfered edge and a ring recess according to one or more embodiments described and illustrated herein.

FIG. 3I schematically illustrates another example waveguide substrate 300'" comprising a connector ferrule 317'" having a chamfered edge 331 and a ring recess 334 within the optical coupling surface 330'" and surrounding the output end of the waveguide 310. The ring recess 334 may be created by the laser-damage-and-etch process. The ring recess 334 creates an open region around the waveguide 310 during mating that can receive dust and debris, similar to as described with respect to FIG. 3H.

Other connector ferrule end face structures for debris collection regions can be formed by parallel slots, multiple perpendicular slots (e.g., forming a crisscross grid around the waveguide 310), or by providing a convex surface (e.g., a hemispherical profile with a radius greater than or equal to the ferrule radius) with the waveguide 310 at its most proud location.

Figure 3J:
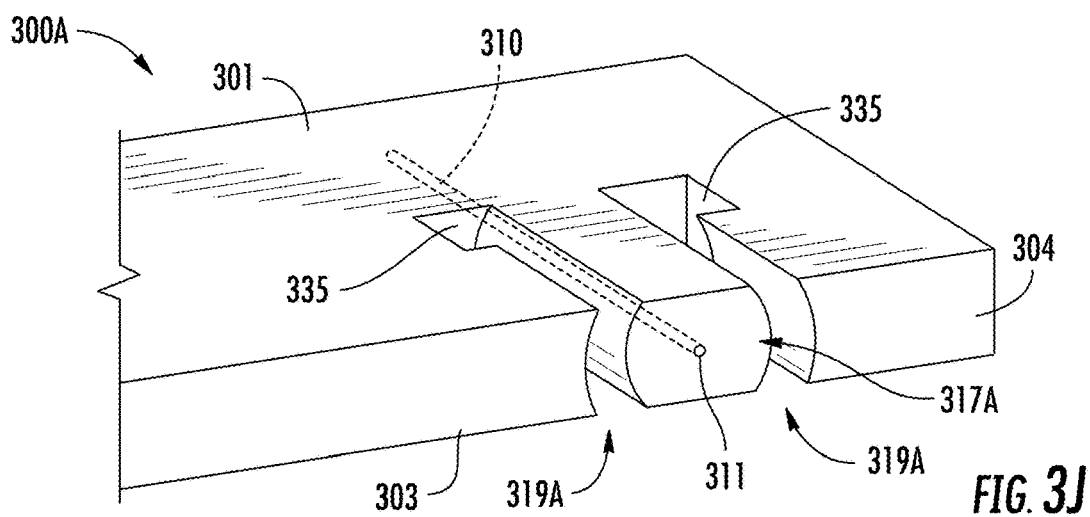
FIG. 3J schematically depicts a partial perspective view of an edge of an example waveguide substrate having an example connector ferrule and an enlarged vertical channel according to one or more embodiments described and illustrated herein.

A concern with etching the connector ferrule 317 from the top involves the flow of the etching solution into the narrow annular ring defined by the two slit openings 319 from above and below prior to dicing. One way to improve the flow of acid etchant and create more uniform etched structures is to selectively increase the width of the annular ring where it meets the first and second surfaces 301, 303. FIG. 3J shows a connector ferrule 317A where the width of the annular region defined by the two slit openings 319 is increased in a region away from the optical coupling surface 330 by an enlarged vertical channel 335. This enlarged vertical channel has a width that is greater than the width of the two slit openings 319, and can be formed by laser exposing it on all sidewalls (including the one that borders the two slit openings 319). After etching progresses to the point that the enlarged vertical channel 335 is completely etched free of the waveguide guide, it is free to fall out of the waveguide substrate 300A through fluidic flow or mechanical vibration. Removal of this larger region creates an enlarged vertical channel 335 that enhances the flow of etchant to the thinner slit openings 319, accelerating the etching process and reducing geometry errors due to uneven etching.

Figure 3K:
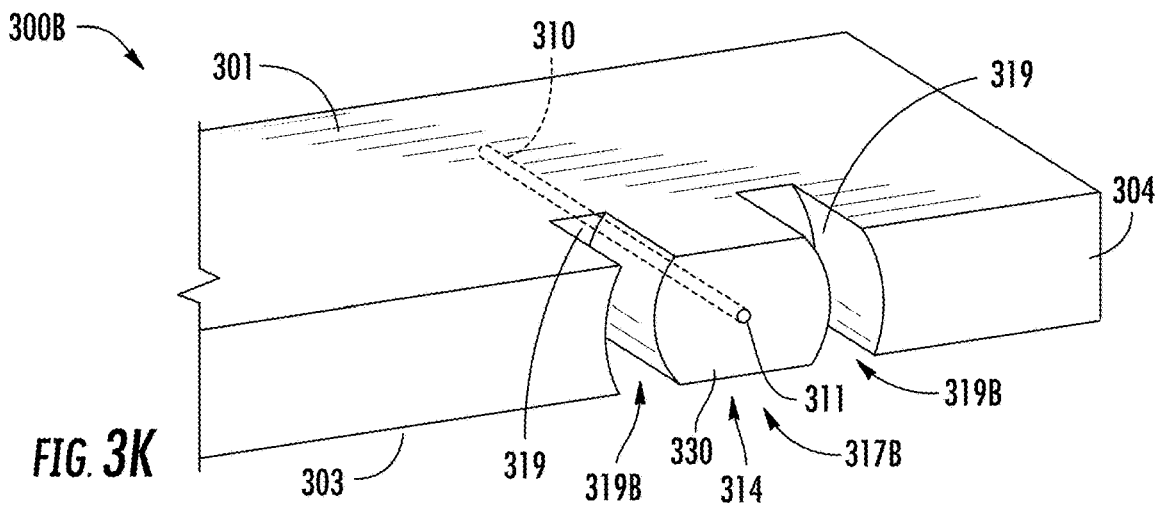
FIG. 3K schematically depicts a partial perspective view of an edge of an example waveguide substrate having an example connector ferrule according to one or more embodiments described and illustrated herein.

FIG. 3K shows a waveguide substrate 300B having a connector ferrule 317B that is shorter than those shown in FIGS. 3A-3J. The shorter connector ferrule 317B may minimize lateral forces during sleeve attachment and optical connector mating, thereby preventing the connector ferrule 317B from being broken off.

Each of the variations shown throughout FIGS. 3A-3K may be used individually, or in combinations with each other.

Figure 4A:
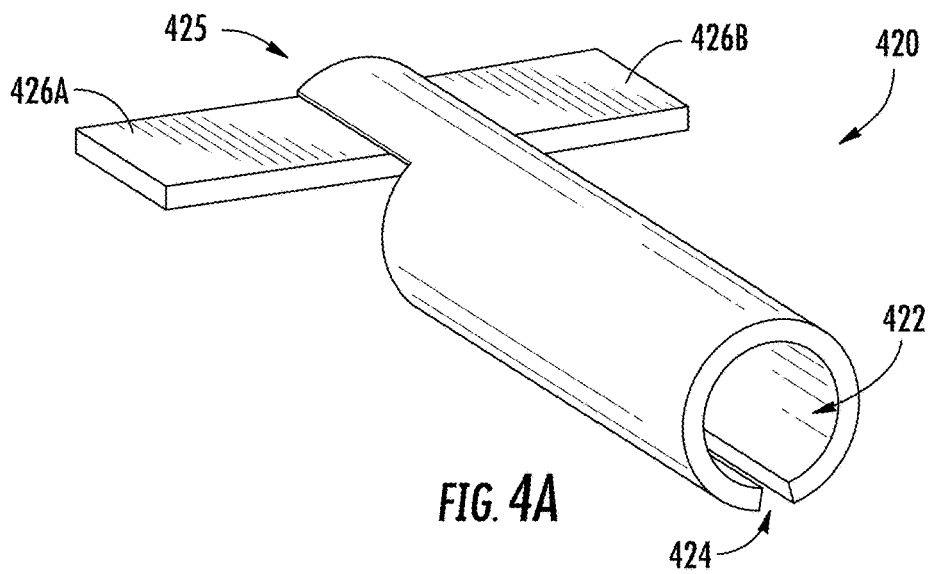
FIG. 4A schematically depicts a perspective view of an example sleeve having tabs according to one or more embodiments described and illustrated herein.
Figure 4B:
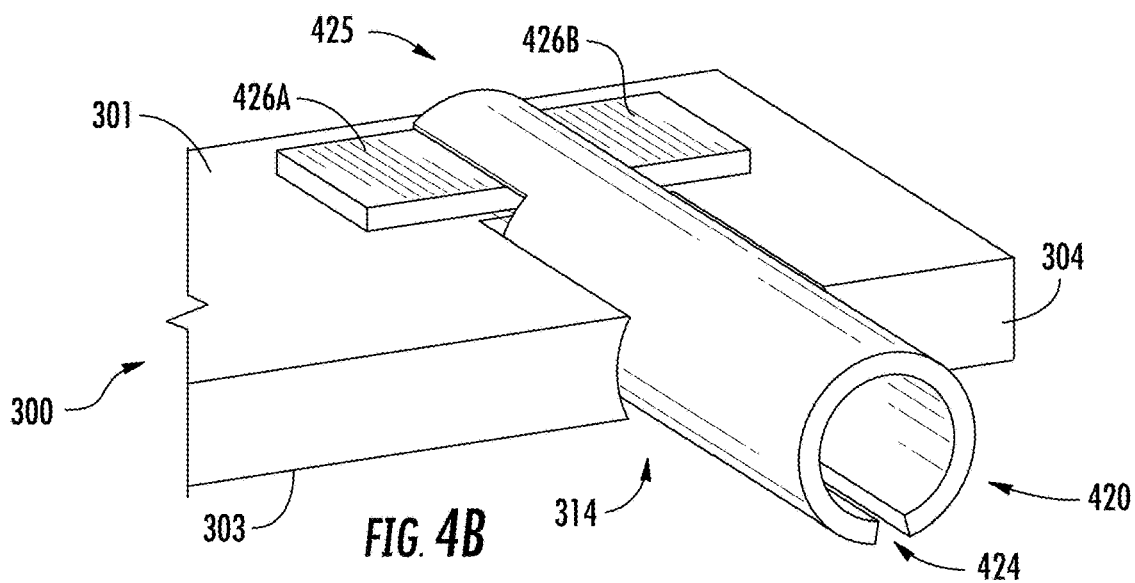
FIG. 4B schematically depicts a perspective view of the example sleeve of FIG. 4A coupled to an example output edge of an example waveguide substrate according to one or more embodiments described and illustrated herein.
Figure 4C:
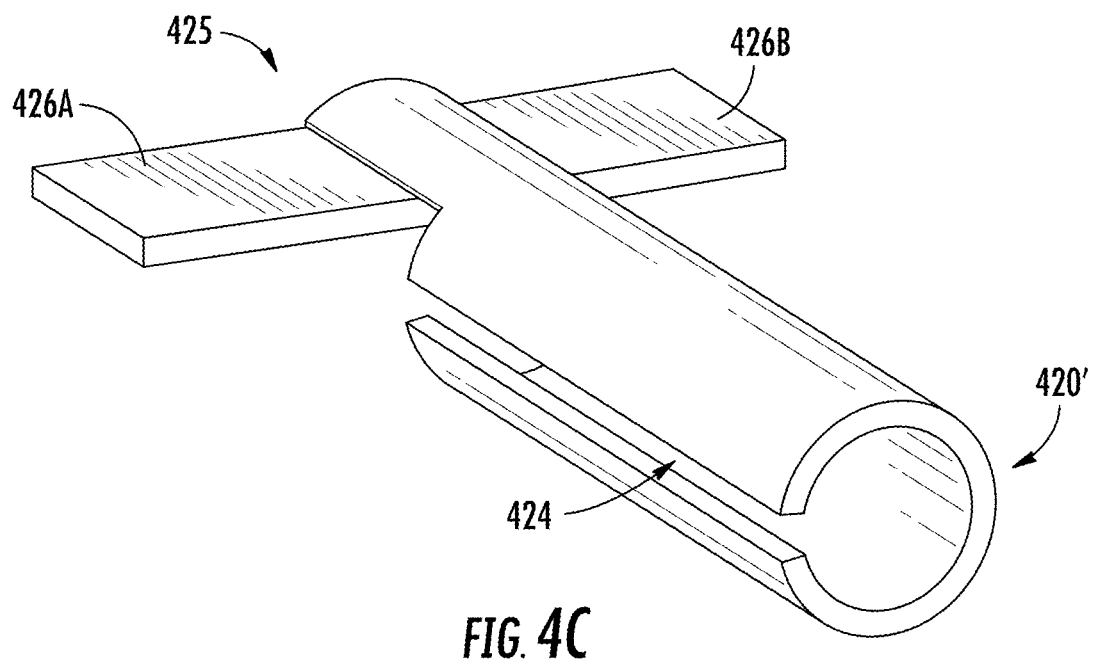
FIG. 4C schematically depicts a perspective view of an example sleeve having tabs according to one or more embodiments described and illustrated herein.

FIGS. 4A-4C schematically illustrate variations of the sleeve 320 shown in FIGS. 3B and 3C. In a standard ferrule-based connector, the ferrules on both sides of the interface are spring mounted so that they are free to be translated and rotated over a limited range during connector mating. The sleeve is retained within a cavity inside the adapter body so that it is free to move laterally and rotate as it slips over mating ferrules.

This is different from the present case where one of the connector ferrules is integrated into a waveguide substrate. The connector ferrule associated with the waveguide substrate is effectively fixed because it is directly tied to an immobile substrate that may be embedded inside a piece of network equipment that is in turn likely mounted inside a fixed equipment rack. Therefore, when the sleeve is slipped over this integrated connector ferrule, it also becomes effectively immobilized (though it can expand and be defected slightly due to its flexibility and sleeve slit). Therefore, this sleeve behaves differently than a sleeve in a standard connector in that it is not substantially free to move relative to the surrounding adapter body (assuming that the adapter body is rigidly attached to the waveguide substrate).

During the process of mating an external connector with the connector ferrule of the waveguide substrate, the spring loaded external connector ferrule of the external connector moves laterally and rotates as it is inserted into the sleeve. Depending on the orientation of the external connector ferrule relative to the sleeve, this mating operation can result in application of force on the sleeve. Since the sleeve is retained in place by its attachment to the waveguide substrate ferrule, lateral forces applied to the middle and cantilevered end of the sleeve create high tensile forces at the base of the waveguide substrate ferrule. This can result in breakage of the connector ferrule of the waveguide substrate.

One solution to isolate connector mating forces from the waveguide substrate ferrule is bond the sleeve directly to the waveguide substrate. This allows connector mating forces to be directly coupled to the waveguide substrate, avoiding the potentially fragile region at the base of the waveguide substrate ferrule.

As shown in FIGS. 4A-4C, the sleeve 420 can be fabricated with tabs 426A, 426B that extend outward to serve as bonding surfaces for adhesive joining to the waveguide substrate 300 first surface 301 and/or second surface 303. In the example of FIGS. 4A and 4B, the tabs 426A, 426B extend the same distance in lateral directions and the sleeve slit 424 is oriented downward. This allows the sleeve 420 to be retained along its top surface, while still being free to expand as it accepts an external connector ferrule during mating. Even if the sleeve 420 defects slightly during external connector mating, it may at least help reduce tensile stresses introduced at the base of the connector ferrule 317. FIG. 4C illustrates the slit 242' as being orientated to the left.

Figure 5A:
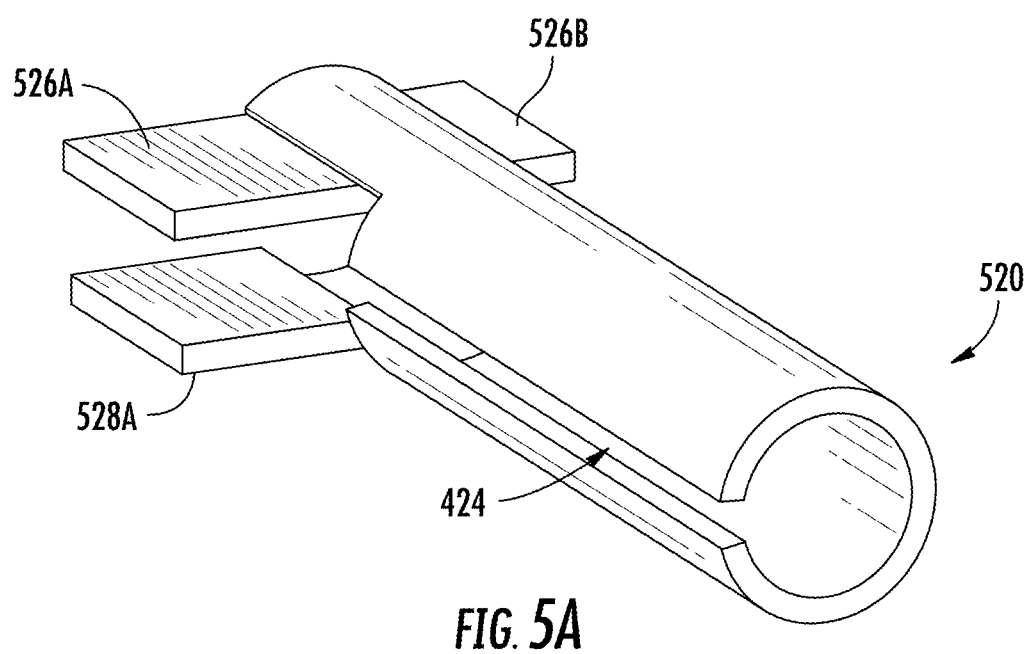
FIG. 5A schematically depicts a perspective view of an example sleeve having tabs configured to contact two surfaces of a waveguide substrate according to one or more embodiments described and illustrated herein.
Figure 5B:
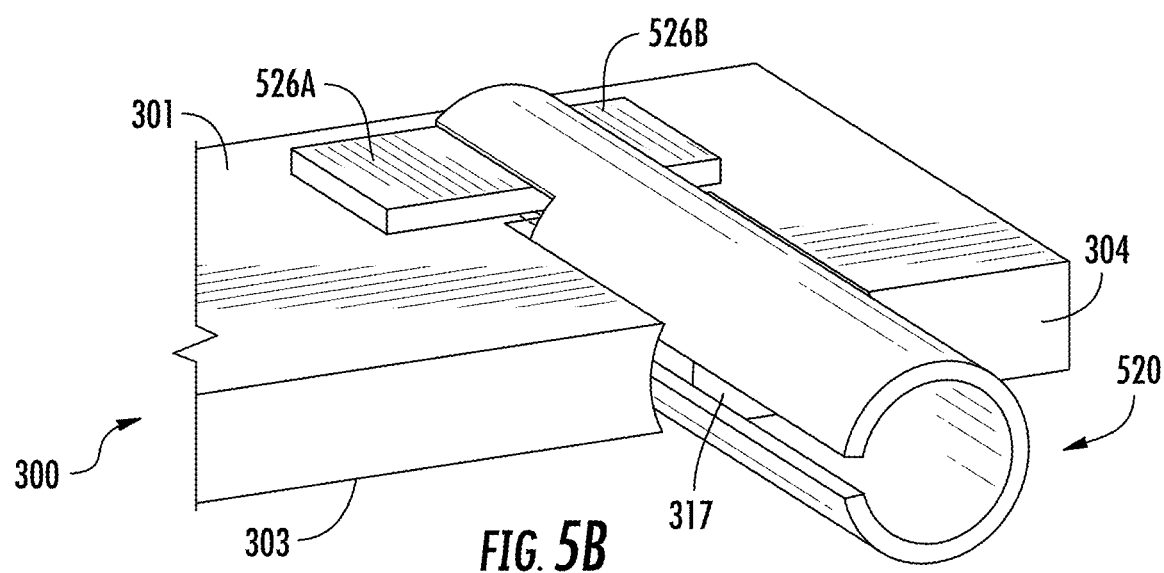
FIG. 5B schematically depicts a perspective view of the example sleeve of FIG. 5A coupled to an example output edge of an example waveguide substrate according to one or more embodiments described and illustrated herein.

FIGS. 5A and 5B illustrate a sleeve 520 that has upper tabs 526A and 526B configured to contact the first surface 301 of the waveguide substrate 300 and lower tabs 528A and 528B configured to contact the second surface 303 of the waveguide substrate 300. FIG. 5A shows the sleeve 520 in isolation, while FIG. 5B shows the sleeve 520 disposed on a connector ferrule 317.

Figures 6A, 6B, 6C:
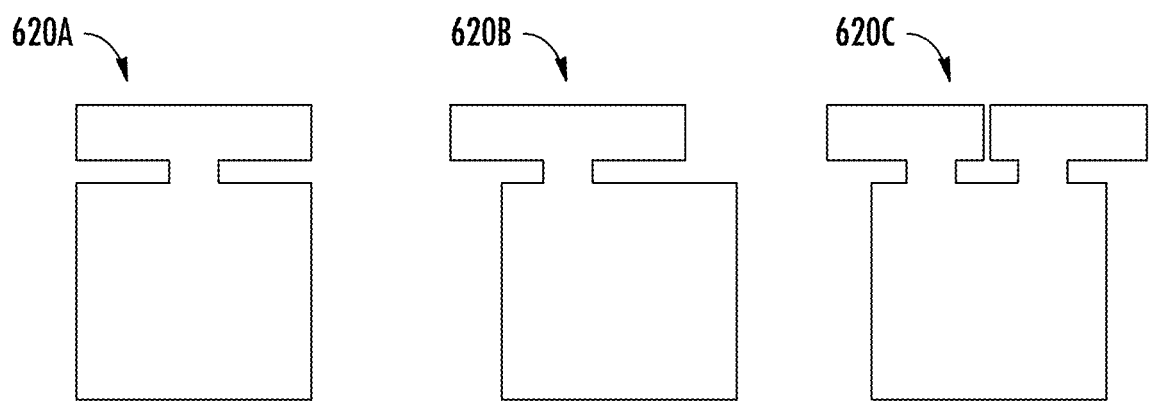
FIG. 6A schematically depicts a metal sheet pattern for forming the sleeve depicted in FIG. 4A according to one or more embodiments described and illustrated herein.
FIG. 6B schematically depicts a metal sheet pattern for forming the sleeve depicted in FIG. 4C according to one or more embodiments described and illustrated herein.
FIG. 6C schematically depicts a metal sheet pattern for forming the sleeve depicted in FIG. 5A according to one or more embodiments described and illustrated herein.

The sleeves having tabs described herein may be stamped out of thin metal sheets with the patterns 620A, 620B, 620C shown in FIG. 6A (sleeve 420), FIG. 6B (sleeve 420') and FIG. 6C (sleeve 520), respectively.

Figure 7:
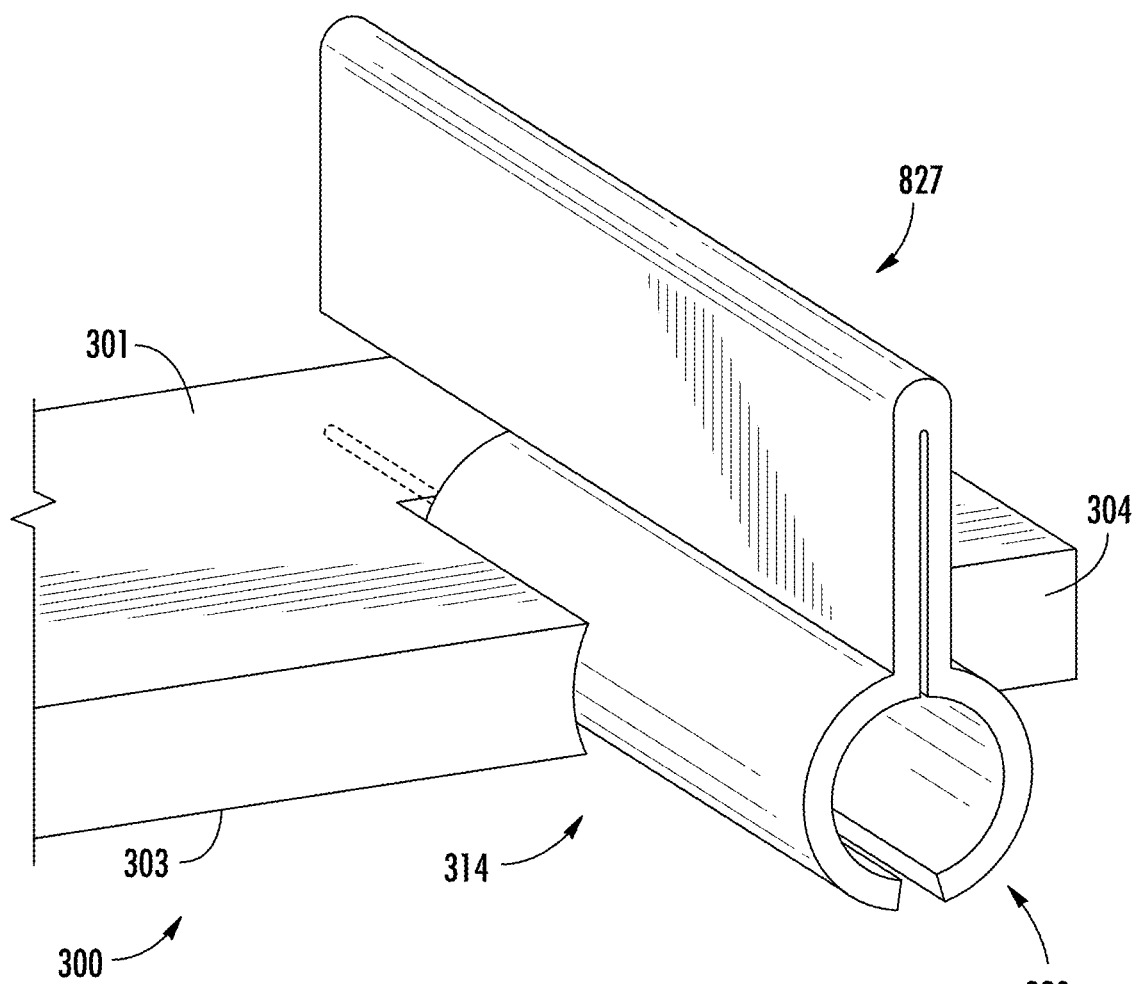
FIG. 7 schematically depicts an example sleeve having a fin coupled to an example output edge of an example waveguide substrate according to one or more embodiments described and illustrated herein.
Figure 8:
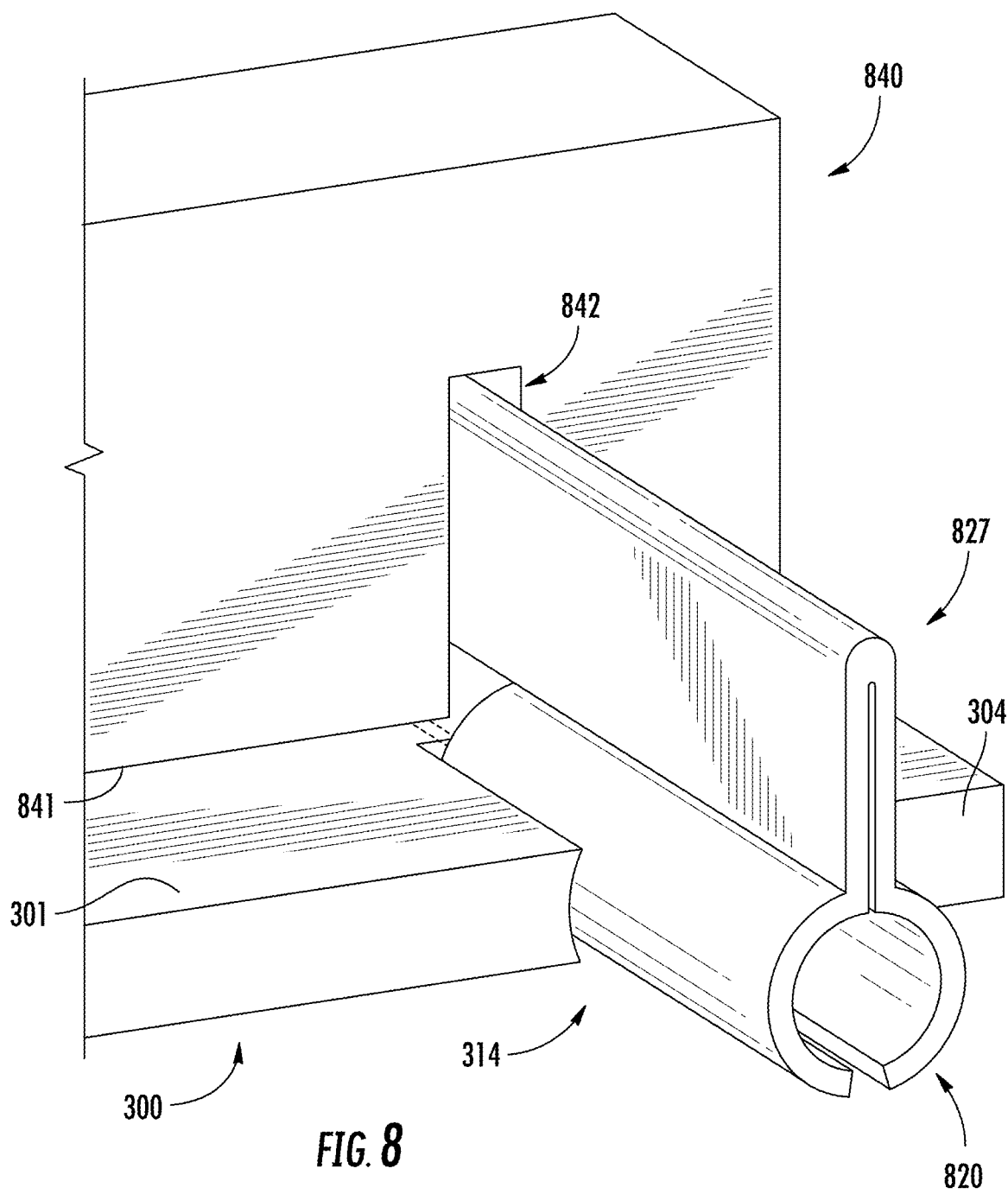
FIG. 8 schematically depicts the example sleeve of FIG. 7 secured to the waveguide substrate by an example securing member according to one or more embodiments described and illustrated herein.

Sleeves of embodiments of the present disclosure may also be immobilized by joining them to the waveguide substrate through an intermediate member. FIG. 7 illustrates an example sleeve 820 that incorporates a fin 827. The fin 827 provides a large surface area for bonding to an intermediate member, such as a securing member 840 as illustrated in FIG. 8. The securing member 840 includes a slot 842 configured to receive the fin 827. A bottom surface 841 of the securing member 840 may be secured to the first surface 301 of the waveguide substrate 300. The securing member 840 may be a portion of an adapter body (not shown) that has been designed to receive the fin 847, or it may be a separate element that attached to the waveguide substrate 300 for the sole purpose of immobilizing the sleeve 820. The fin 847 can include other features, such as right-angle bends, tees, notches, or lobes that engage the securing member 840 and help retain the sleeve 820 in place.

Figure 9A:
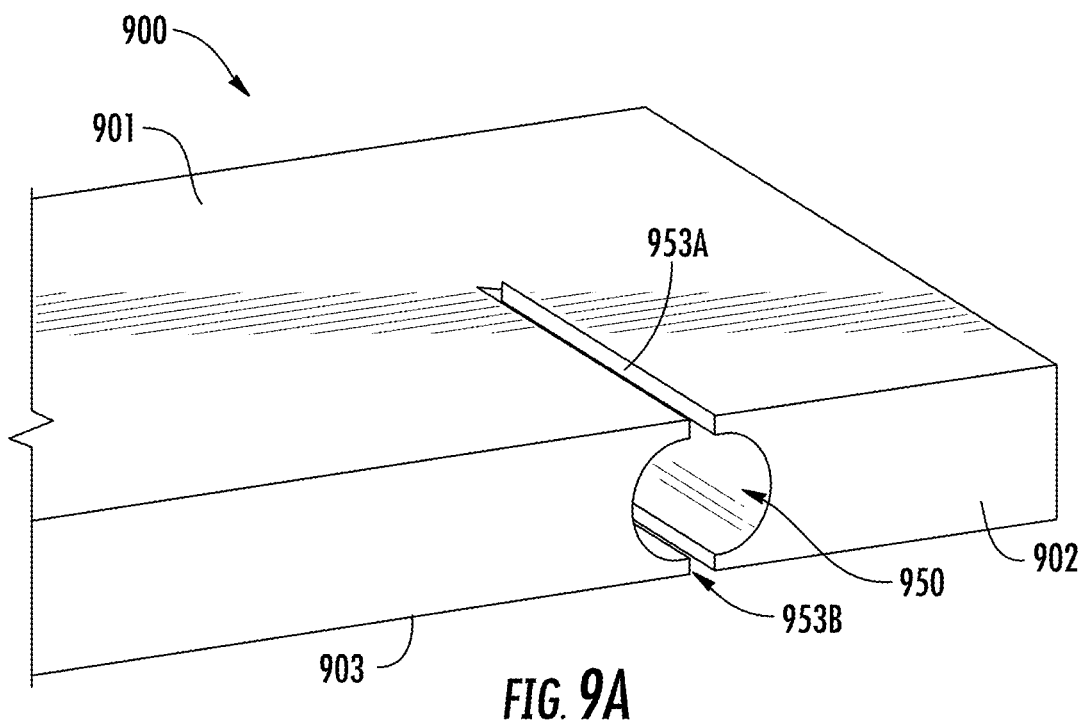
FIGS. 9A and 9B schematically depict example pin bores within an edge of an example waveguide substrate according to one or more embodiments described and illustrated herein.
Figure 9B:
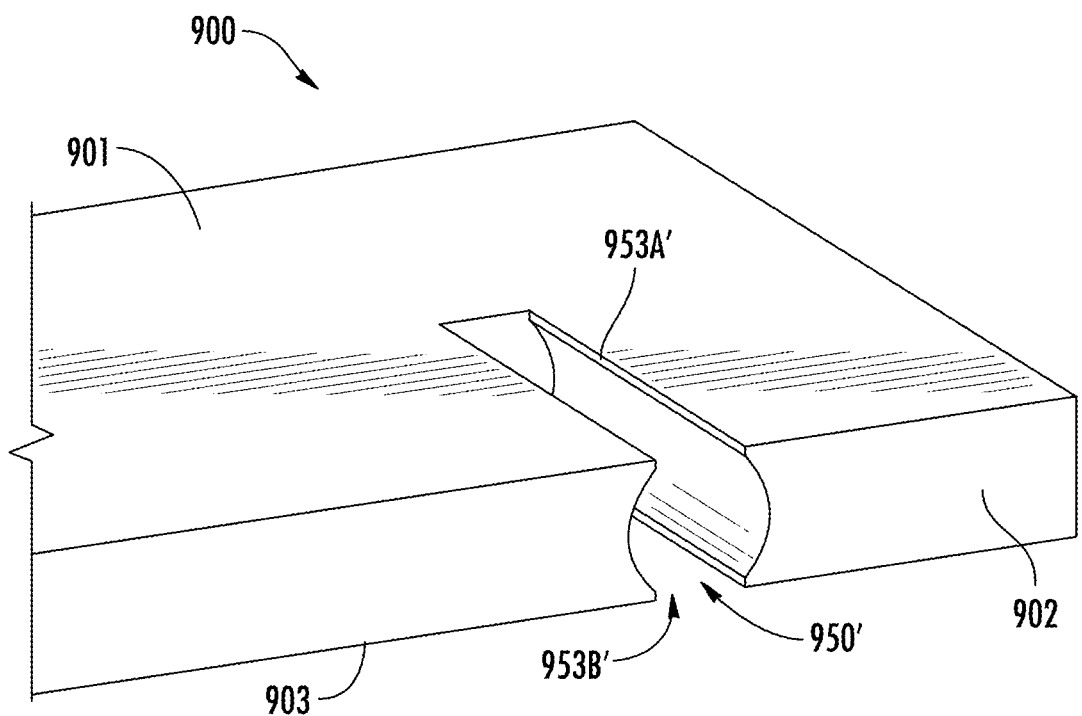

As shown in FIGS. 2A-2C, the laser-damage-and-etch process may be used to form pin bores (e.g., first pin bore 213A and second pin bore 213B) in one or more edges of the waveguide substrate 200. The pin bores may be configured to accept alignment pins commonly used in MT-style connectors, for example. FIG. 9A schematically depicts an example waveguide substrate 900 having an example pin bore 950 in an input edge 902. The pin bore 950 has a cylindrical shape. However, the pin bore 950 may take on other shapes, such as a slot, for example.

Additionally, a first slot 953A extends from a first surface 901 of the waveguide substrate 900 to the pin bore 950, and a second slot 953B extends from a second surface 903 of the waveguide substrate 900 to the pin bore 950. The first slot 953A and the second slot 953B provide additional paths for the etching solution to more easily reach all laser-damaged regions around the perimeter of the pin bore 950. It should be understood that only one slot may be provided in embodiments.

Depending on the thickness of the waveguide substrate 900, it is possible that the diameter of the guide pin of the optical connector will exceed the thickness of the waveguide substrate 900. In this case, the first slot 953A' and the second slot 953B' may have a width large enough to accommodate the top and bottom of the guide pin so that the top and bottom of the guide pin extend above the first surface 901 and the second surface of the waveguide substrate 900, respectively. Thus, the pin bore 950' will only contact the guide pin on its left and right sides.

Figure 10:
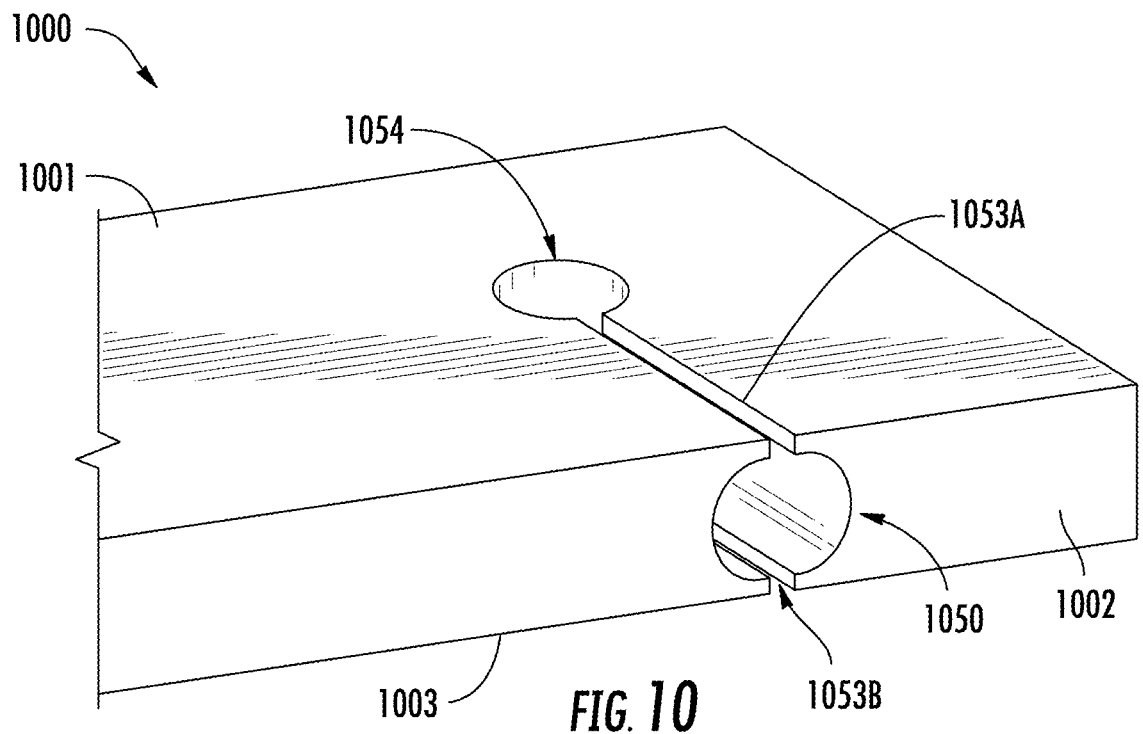
FIG. 10 schematically depicts an example pin bore with a vertical hole in an example waveguide substrate according to one or more embodiments described and illustrated herein.

In some embodiments, enhanced etching solution flow to the laser damaged region of the pin bore may be provided by additional features. FIG. 10 schematically depicts a partial view of a waveguide substrate 1000 having a first surface 1001, a second surface 1003 and an input edge 1002. The waveguide substrate 1000 has a pin bore 1050, a first slot 1053A, and a second slot 1053B as depicted in FIG. 9A. However, the waveguide substrate 1000 further includes a vertical hole 1054 through the first slot 1053A, the pin bore 1050 and the second slot 1053B at an end of the pin bore 1050 that is distal from input edge 1002. The vertical hole 1054 provides additional access to the pin bore 1050 to etch the material away within the pin bore 1050. If the vertical hole 1054 is laser damaged around its entire perimeter, it will drop out during etching, increasing the opportunity for etchant liquids to flow to the laser damaged regions that define the pin bore 1050.

Figure 11:
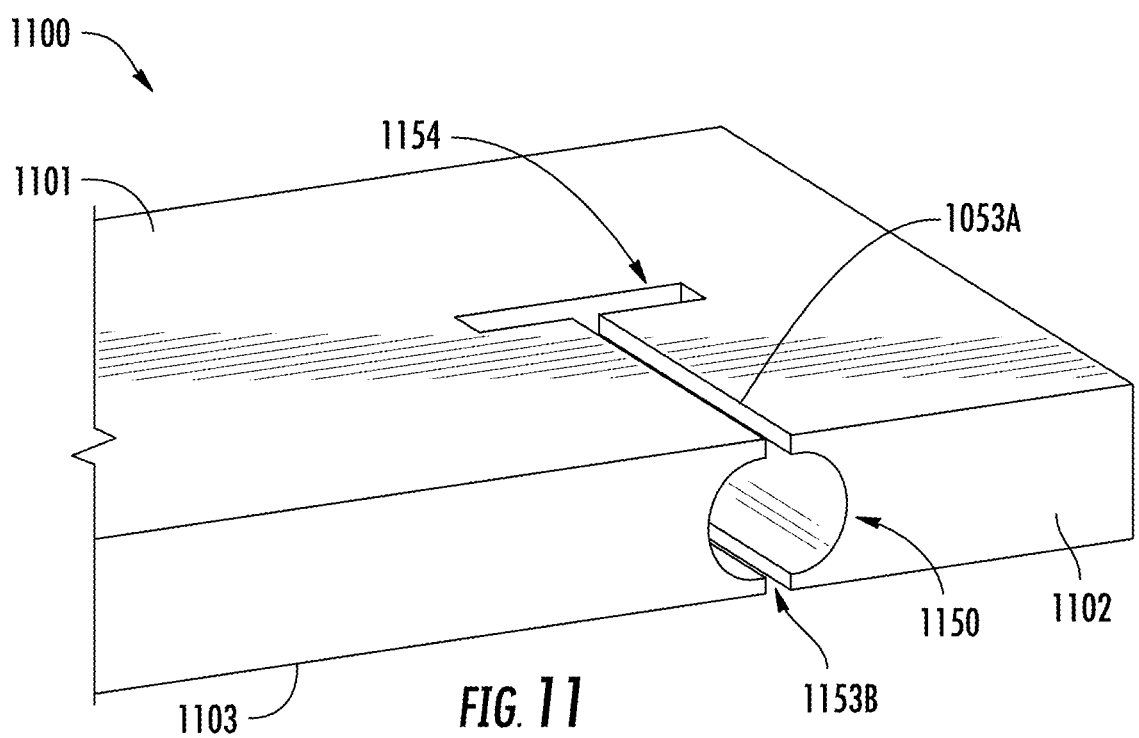
FIG. 11 schematically depicts an example pin bore with a vertical slot in an example waveguide substrate according to one or more embodiments described and illustrated herein.

FIG. 11 schematically depicts a partial view of a waveguide substrate 1100 having a first surface 1101, a second surface 1103 and an input edge 1102. The waveguide substrate 1100 has a pin bore 1150, a first slot 1153A, and a second slot 1153B as depicted in FIG. 9A. However, the waveguide substrate 1100 further includes an additional vertical slot 1154 through the first slot 1153A, pin bore 1150 and the second slot 1153B at an end of the pin bore 1150 that is distal from input edge 1102. The additional vertical slot 1154 provides additional access to the pin bore 1150 to etch the material away within the pin bore 1150.

Figure 12:
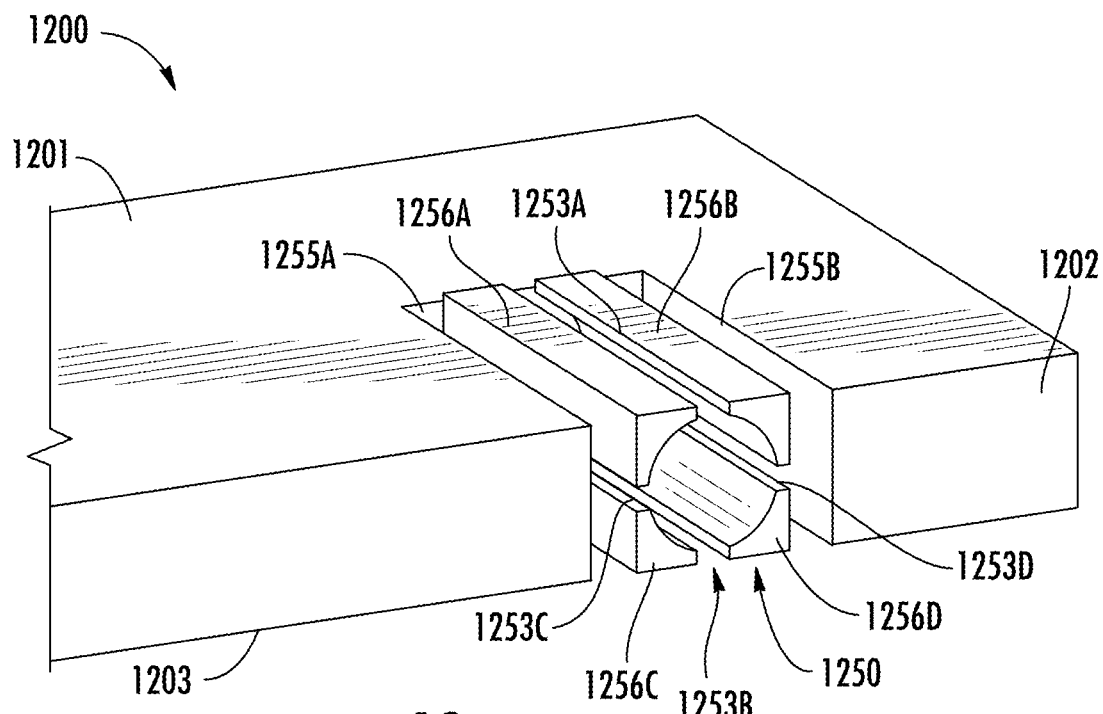
FIG. 12 schematically depicts an example pin bore with several slots in an example waveguide substrate according to one or more embodiments described and illustrated herein.

Additional features may be provided to increase access to the pin bore for the etching solution. FIG. 12 illustrates a partial view of another example waveguide substrate 1200. The waveguide substrate 1200 has a first surface 1201, a second surface 1203, an input edge 1202 and a pin bore 1250. The waveguide substrate 1200 has a first vertical slot 1253A extending from the first surface 1201 to the pin bore 1250 and a second vertical slot 1253B extending from the second surface 1203 to the pin bore 1250. The waveguide substrate 1200 further includes a first additional slot 1255A disposed on a first side of the pin bore 1250, and a second additional slot 1255B disposed on a second side of the pin bore 1250. To provide even greater etching solution access to the pin bore 1250, the waveguide substrate 1200 further includes a third slot 1253C extending from the at pin bore 1250 to the first additional slot 1255A, and a fourth slot 1253D extending from the pin bore 1250 to the second additional slot 1255B. These various slots result in a first pin bore arm 1256A, a second pin bore arm 1256B, a third pin bore arm 1256C and a fourth pin bore arm 1256D. These pin bore arms may provide for compliance to enable an alignment pin to be inserted.

Figure 13:
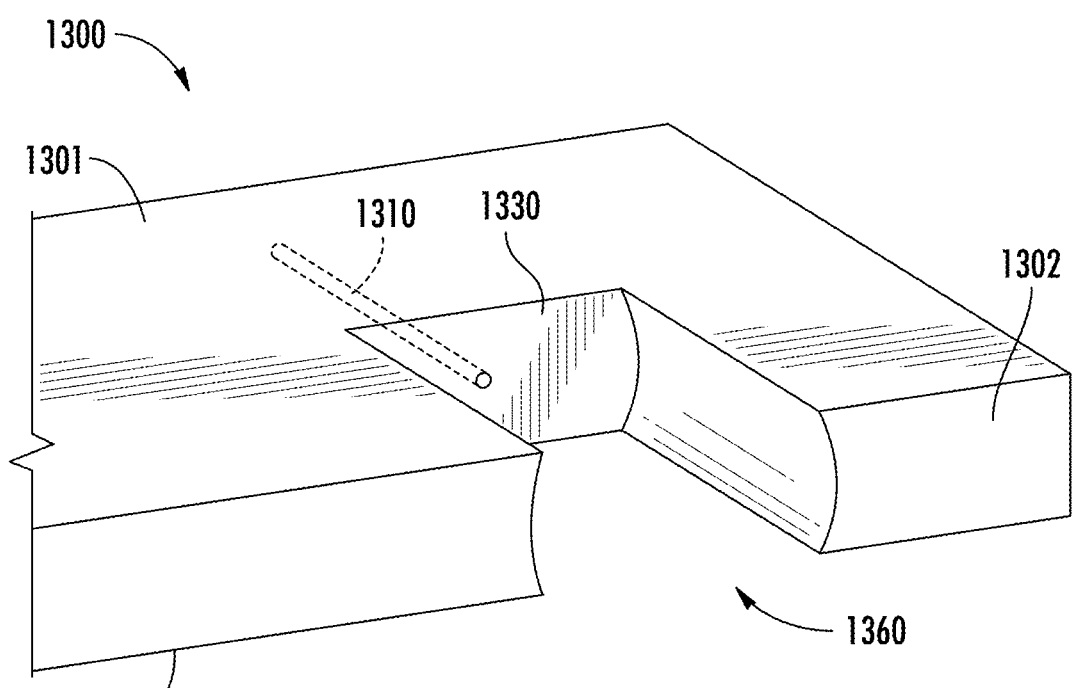
FIG. 13 schematically depicts a sleeve cavity in an edge of an example waveguide substrate according to one or more embodiments described and illustrated herein.

In some embodiments, a sleeve may be inserted into a cavity of an edge of the waveguide substrate so that is centered on a waveguide. FIG. 13 schematically illustrates a partial view of another waveguide substrate 1300 having a first surface 1301, a second surface 1303 and a cavity 1360 etched into an output edge 1304. The cavity 1360 has an inner diameter that corresponds to an outer diameter of a sleeve (not shown). The cavity 1360 is centered about a waveguide 1310 at an optical coupling surface 1330 that is offset from the output edge 1304. The design shown in FIG.

13 assumes that the outer diameter of the sleeve is larger than a thickness of the waveguide substrate 1300.

Figure 14:
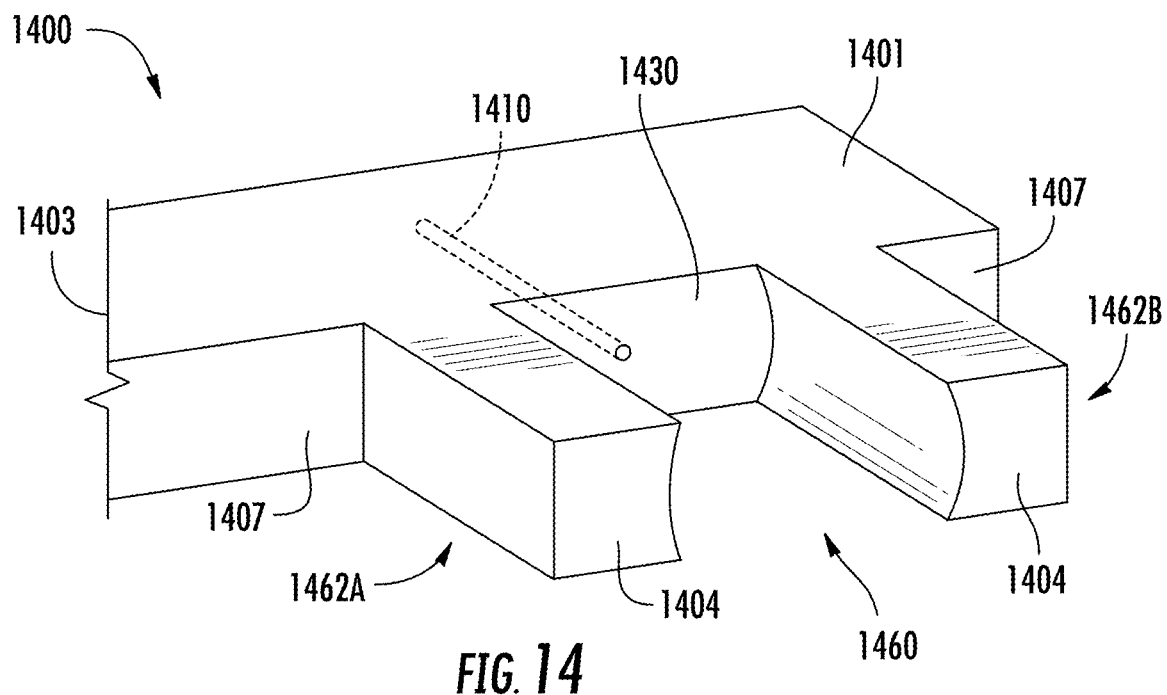
FIG. 14 schematically depicts an example ferrule cavity in an edge of an example waveguide substrate according to one or more embodiments described and illustrated herein.
Figure 15:
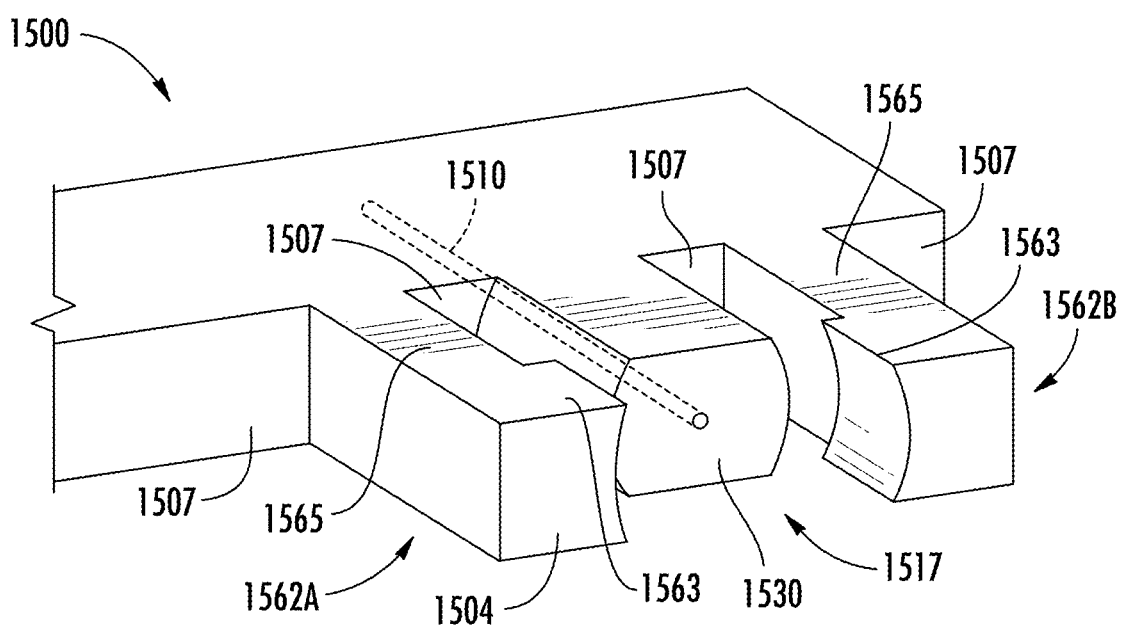
FIG. 15 schematically depicts another example ferrule cavity in an edge of an example waveguide substrate according to one or more embodiments described and illustrated herein.

The connector ferrules described above use a separate sleeve component to align the waveguide substrate connector ferrule to the external connector ferrule of the mated optical connector. FIGS. 14 and 15 depict solutions where the sleeve is integral to the waveguide substrate and is formed using the laser-damage-and-etch process. Particularly, FIG. 14 schematically depicts a partial view of another example waveguide substrate 1400 comprising a first surface 1401, a second surface 1403 and an output edge 1402. The waveguide substrate 1400 further comprises an optical coupling surface 1430 that is proximate the output edge 1402, a first sleeve arm 1462A extending from a first side of the optical coupling surface 1430, and a second sleeve arm 1462B extending from a second side of the optical coupling surface 1430. The first sleeve arm 1462A and the second sleeve arm 1462B define a cavity 1460 that is sized to receive an external connector ferrule (not shown). It is noted that the design of FIG. 14 assumes that that the diameter of the external connector ferrule is greater than a thickness of the waveguide substrate 1400. A recessed surface 1407 is present next to the first sleeve arm 1462A and the second sleeve arm 1462B are such that they are free to move outward to accommodate and automatically center the external connector ferrule on the center of the waveguide. The width of the cavity 1460 can remain the same moving in towards the optical coupling surface 1430, or alternatively it can be tapered down so that the external connector ferrule is gradually guided to the correct position.

FIG. 15 schematically illustrates a partial view of another waveguide substrate 1500 having a first sleeve arm 1562A and a second sleeve arm 1562B that extend from a recessed surface 1507. A connector ferrule 1517 or other type of boss may extend from the recessed surface 1507 such that a waveguide 1510 is disposed within the connector ferrule 1517. In the illustrated embodiment of FIG. 15, the first and second sleeve arms 1562A, 1562B have a thin portion 1565 and a wide portion 1563. Thus, the first and second sleeve arms 1562A, 1562B are thinner where they meet the recessed surface 1507 than where they make contact with an external connector ferrule (not shown) during mating. By providing a thin portion 1565 near the recessed surface 1507, the first and second sleeve arms 1562A, 1562B are more flexible. By providing a connector ferrule 1517 or other boss element, it ensures that the first and second sleeve arms 1562A, 1562B are sufficiently flexible at the optical coupling surface 1530, which may not be the case if the connector ferrule 1517 or another boss element were eliminated.

Figure 16A:
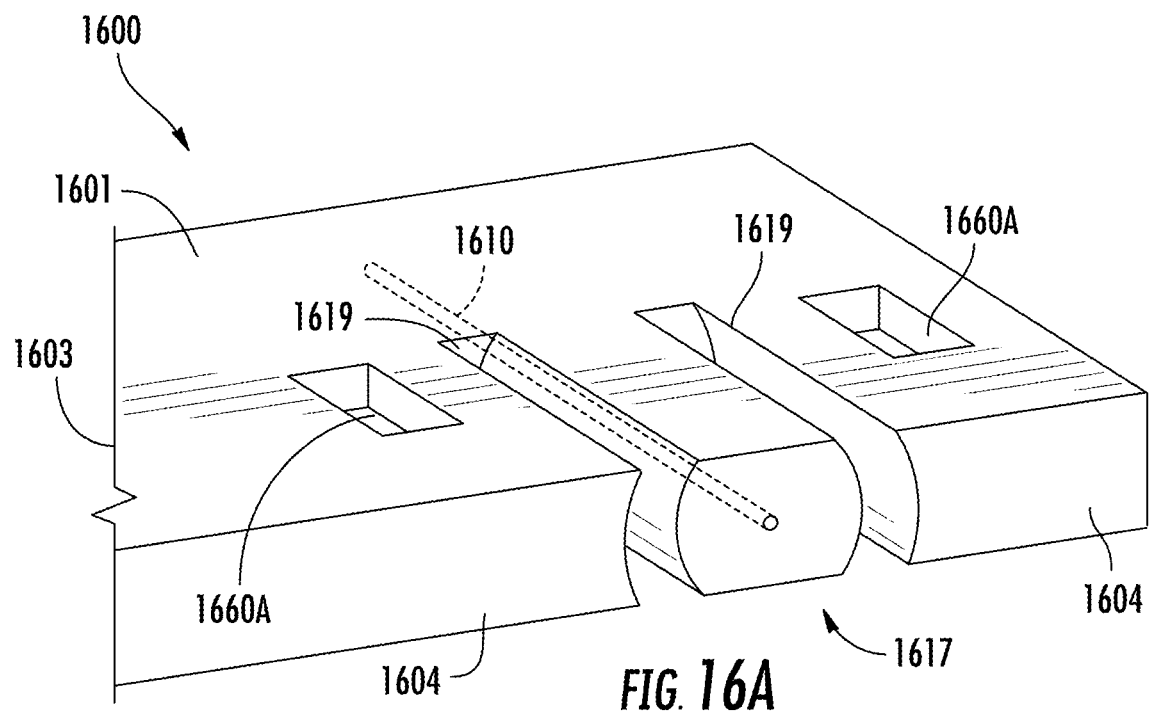
FIG. 16A schematically depicts a partial perspective view of an example waveguide substrate having two engagement depressions within a surface according to one or more embodiments described and illustrated herein.

Additional features may be fabricated by the laser-damage-and-etch process. FIG. 16A illustrates a partial view of another example waveguide substrate 1600 having a first surface 1601, a second surface 1603, an output edge 1604, and a connector ferrule 1617 defined by two slits openings 1619. The first surface 1601 has a first engagement depression 1660A and a second engagement depression 1660B etched therein. The first engagement depression 1660A and the second engagement depression 1660B are sized and are designed to engage and retain a pin, post, boss, or other retention feature of a connector housing attached to the output edge 1604 or output edge 1604.

Figure 16B:
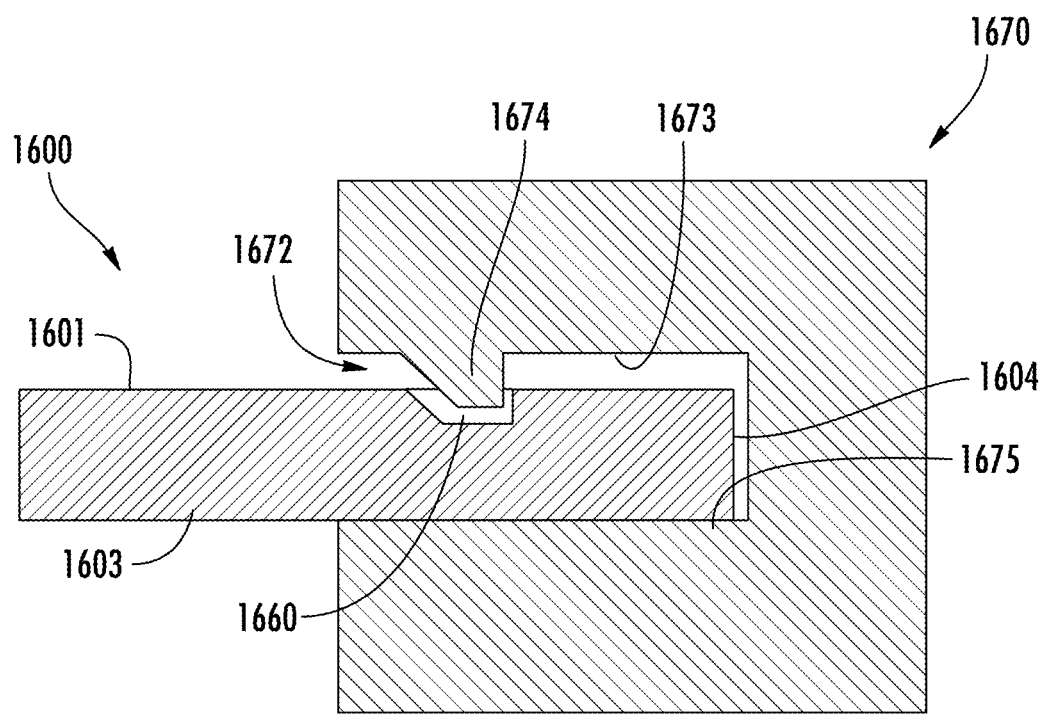
FIG. 16B schematically depicts the example waveguide substrate of FIG. 16A coupled to an example connector housing according to one or more embodiments described and illustrated herein.

FIG. 16B schematically depicts a side view of the waveguide substrate 1600 illustrated by FIG. 16A inserted into an example connector housing 1670 attached to the output edge 1604. The example connector housing 1670 has an opening 1672 to receive the waveguide substrate 1600. The second surface 1603 of the waveguide substrate 1600 rests on a bottom surface 1675 of the opening 1672. A retention feature 1674 is formed on an upper surface 1673 of the opening. The retention feature 1674 is disposed within the engagement depression. In some embodiments, the retention feature 1674 has a lead-in taper to guide it into the engagement depression 1660. The placement of the retention feature 1674 in the engagement depression 1660 assists in aligning the connector housing 1670 to the waveguide substrate 1600 and the waveguides therein, while also securing the connector housing 1670 to the waveguide substrate 1600. The connector housing 1670 can be designed to flex slightly during mounting so that after the retention feature 1674 reaches the engagement depression 1660 the connector housing 1670 relaxes to a state where it closely grips the waveguide substrate 1600.

The first engagement depression 1660A and the second engagement depression 1660B can have straight sides as shown in FIGS. 16A and 16B, or it can be curved in the form of, for example, a spherical depression, a conical depression, or a cylindrical depression. Tapered sidewalls can help the retention feature 1674 center on the engagement depression so that the connector housing 1670 is precisely positioned relative to the waveguide substrate laser written waveguides 1610. For example, the retention feature 1674 can provide a raised spherical section, conic section, or round boss. The retention feature 1674 can also be mounted on a deformable arm that acts as a spring to force the retention feature down into the surface depression during connector housing 1670 attachment.

It should be understood that one or more engagement depressions 1660 may also be etched into the second surface 1603 of the waveguide substrate 1600.

Figure 17A:
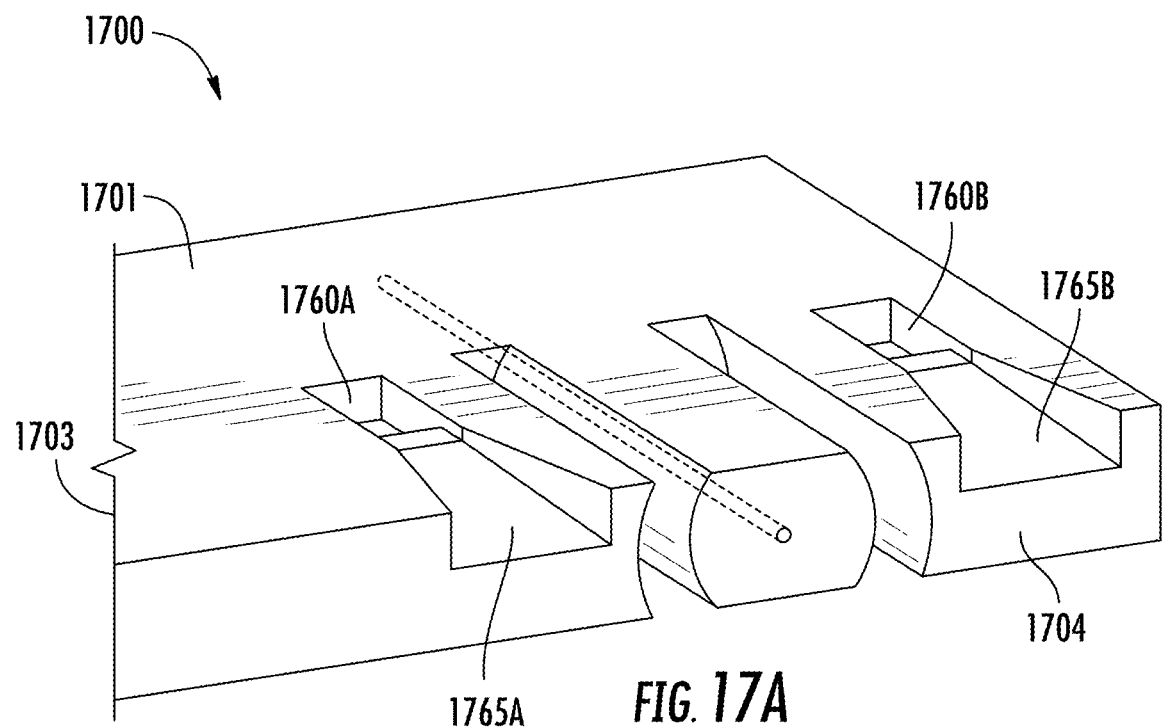
FIG. 17A schematically depicts a partial perspective view of an example waveguide substrate having two engagement depressions and two guide tapers within a surface according to one or more embodiments described and illustrated herein.
Figure 17B:
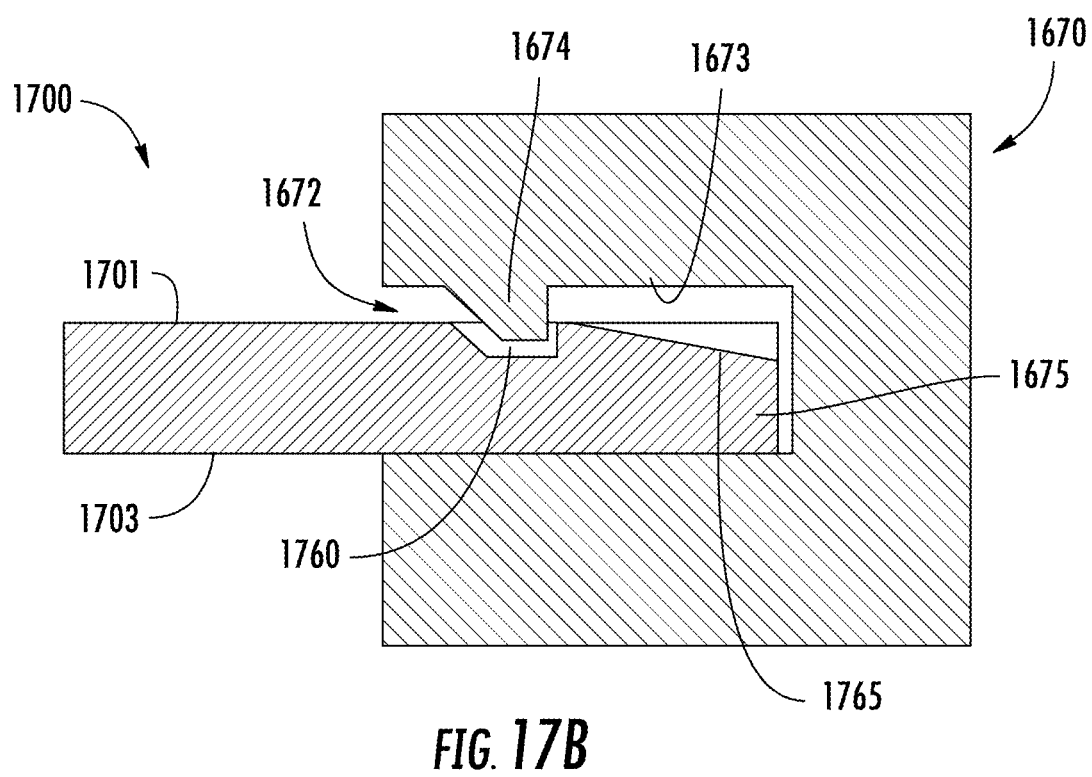
FIG. 17B schematically depicts the example waveguide substrate of FIG. 17A coupled to an example connector housing according to one or more embodiments described and illustrated herein.

FIGS. 17A and 17B schematically illustrate another example waveguide substrate 1700 having a first surface 1701, a second surface 1703, and an output edge 1704. The example waveguide substrate 1700 has a first guide taper 1765A extending from the output edge 1704 to the first engagement depression 1760A and a second guide taper 1765B extending from the output edge 1704 to the second engagement depression 1760B. The first and second guide tapers 1765A, 1765B provide a ramp to ease the attachment of the connector housing 1670 to the waveguide substrate 1700. A depth of the first and second guide tapers 1765A, 1765B decreases from the output edge 1704 to the first and second engagement depressions 1760A, 1760B, respectively.

Figure 18:
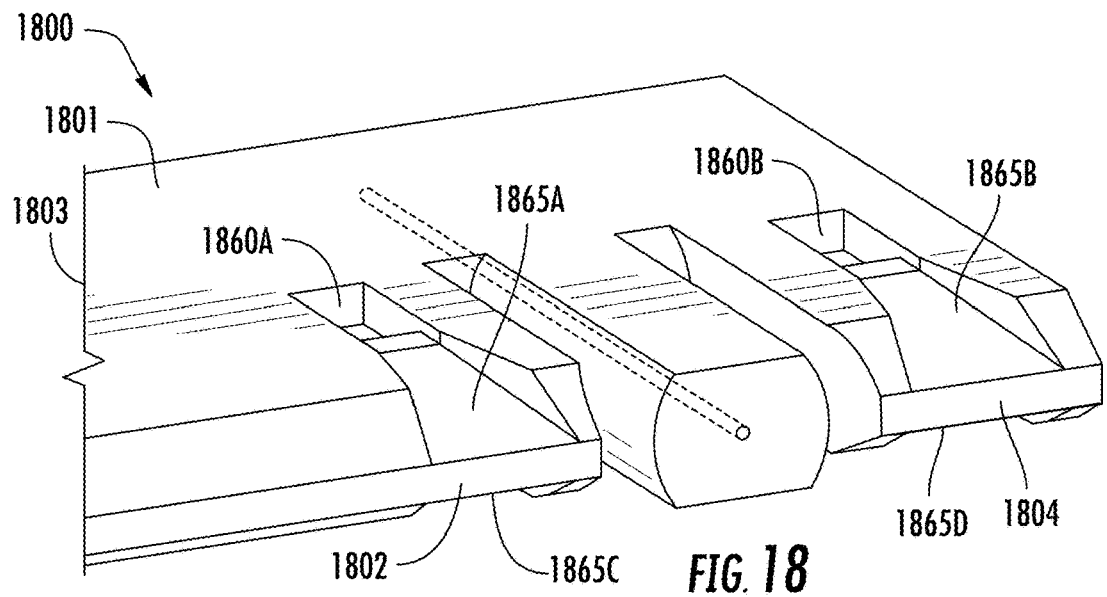
FIG. 18 schematically depicts a partial perspective view of an example waveguide substrate having two engagement depressions and two guide tapers within two surfaces according to one or more embodiments described and illustrated herein.

FIG. 18 illustrates a partial view of another example waveguide substrate 1800 having a first engagement depression 1860A, a first guide taper 1865A, a second engagement depression 1860B, and a second guide taper 1865B on a first surface 1801. The example waveguide substrate 1800 also includes a third engagement depression (not visible), a third guide taper 1865C, a fourth engagement depression (not visible), and a fourth guide taper 1865D on a second surface 1803. Thus, the waveguide substrate 1800 illustrated by FIG. 18 is configured to engage with retention features (not shown) on both surfaces of the waveguide substrate 1800.

Figure 19:
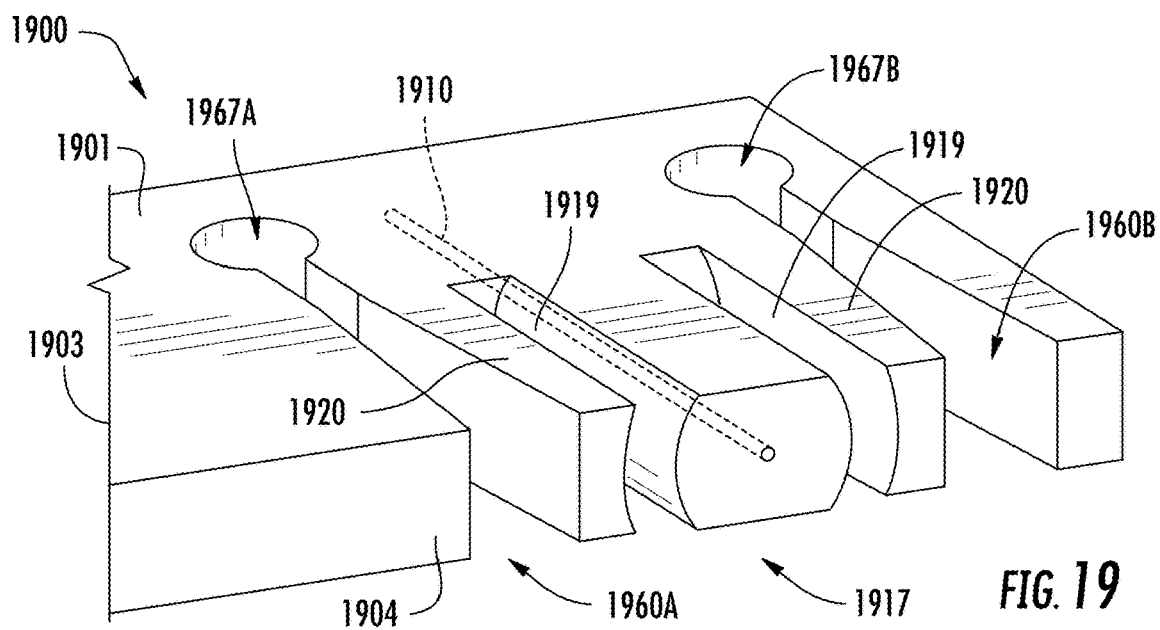
FIG. 19 schematically depicts a partial perspective view of an example waveguide substrate having a connector ferrule and two tapered vertical slots according to one or more embodiments described and illustrated herein.
Figure 20:
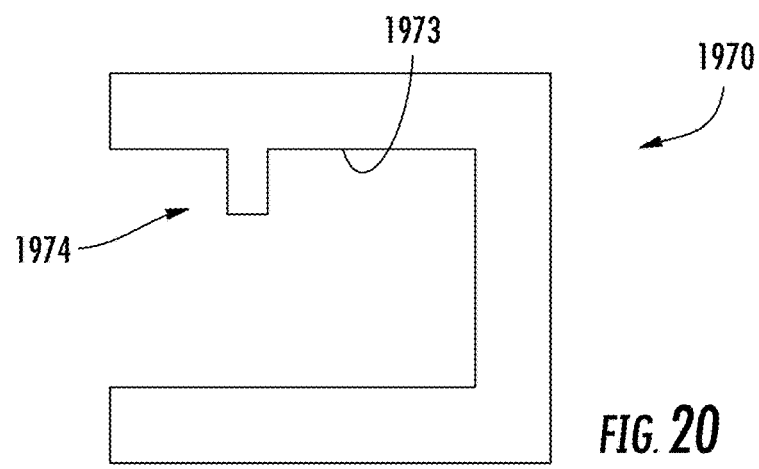
FIG. 20 schematically depicts a cross sectional view of an example connector housing configured to receive the example waveguide substrate of FIG. 19 according to one or more embodiments described and illustrated herein.

In some embodiments, vertical slots can also be formed in the waveguide substrate with taper regions and cylindrical capture regions. Referring now to FIG. 19, another example waveguide substrate 1900 is schematically illustrated. The example waveguide substrate 1900 has a first tapered vertical slot 1960A and a second tapered vertical slot 1960B extending from an output edge 1904. In the illustrated embodiment, the first and second tapered vertical slots 1960A, 1960B become narrower further away from the output edge 1904, and terminate at a first cylindrical vertical channel 1967A and a second cylindrical vertical channel 1967B, respectively. The first and second cylindrical vertical channels 1967A, 1967B act as capture regions for raised spherical or conical boss retention features 1974 extending from a surface 1973 of a connector housing 1970, as shown in the example depicted by FIG. 20. The first and second tapered vertical slots 1960A, 1960B may be positioned in close proximity to the etched regions 1919 around the connector ferrule 1917, allowing the arms 1920 adjacent to the first and second tapered vertical slots 1960A, 1960B to be flexible during connector mating if needed. It is noted that, in some embodiments, the output edge 1904 may be chamfered to enable mating with the connector housing 1970.

The first and second tapered vertical slots 1960A, 1960B and first and second cylindrical vertical channels 1967A, 1967B may be fabricated using the same laser-damage-and-etch process used to form the connector ferrule 1917 and other features. This ensures that the first and second cylindrical vertical channels 1967A, 1967B are precisely aligned to the connector ferrule 1917, enabling passive alignment of the connector housing 1970 to the waveguide substrate 1900. In other embodiments, the first and second tapered vertical slots 1960A, 1960B and first and second cylindrical vertical channels 1967A, 1967B may be fabricated from a separate laser-damage-and-etch process from the connector ferrule 1917.

Figure 21A:
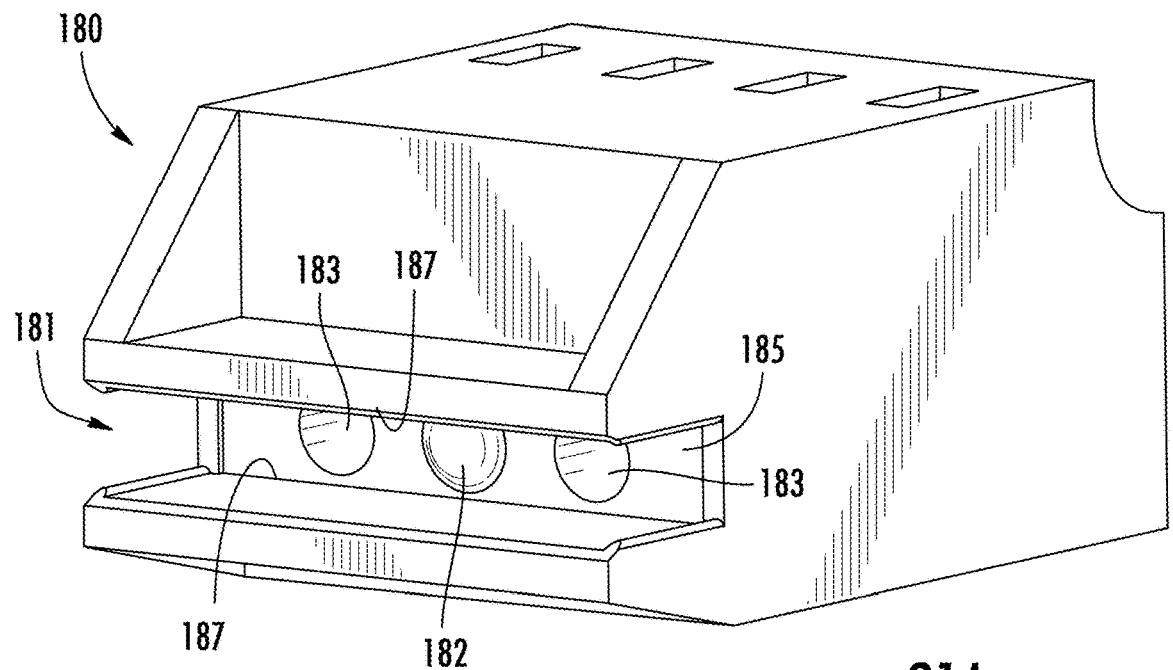
FIG. 21A schematically depicts a front perspective view of an example output connector housing according to one or more embodiments described and illustrated herein.
Figure 21B:
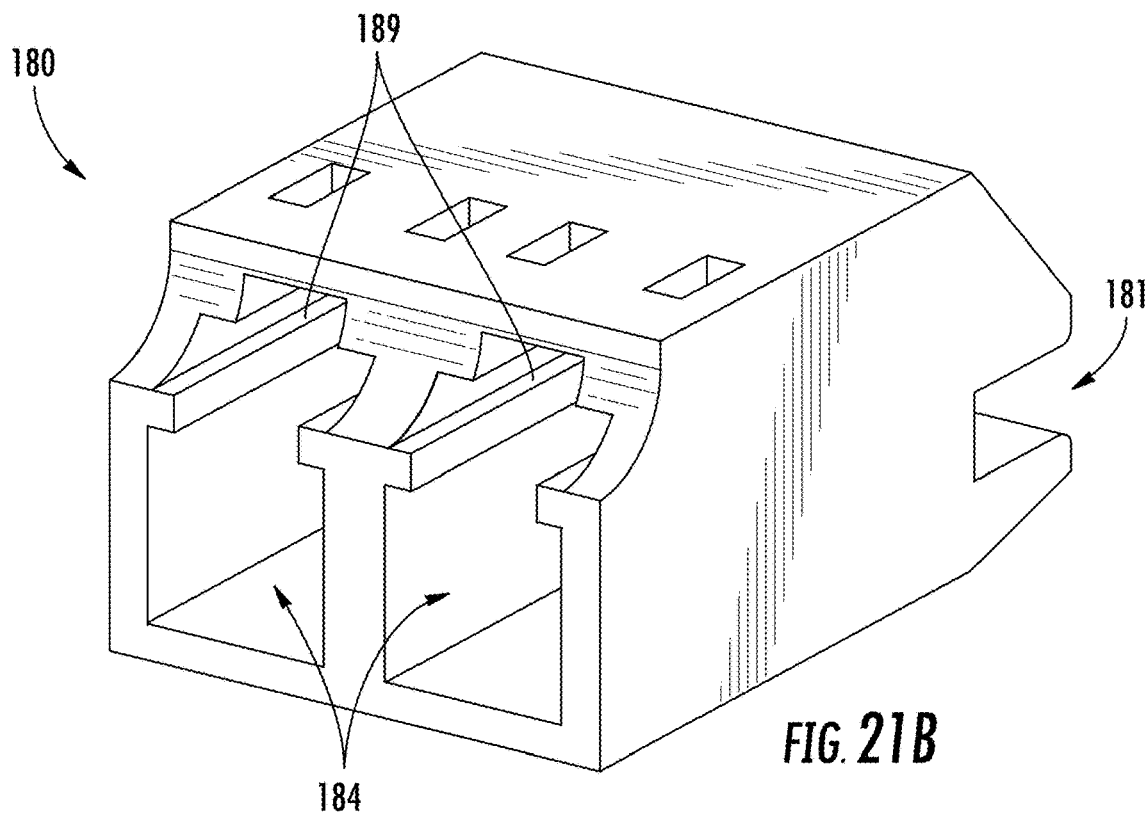
FIG. 21B schematically depicts a rear perspective view of the example connector housing of FIG. 21A according to one or more embodiments described and illustrated herein.

Referring now to FIGS. 21A and 21B, an example output connector housing 180 is schematically illustrated. FIG. 21A depicts a front side of the output connector housing 180 that attaches to an output edge of a waveguide substrate, and FIG. 21B depicts a rear side view of the output connector housing 180 that is configured to receive two optical connectors. Generally, the output connector housing 180 may be configured to receive any type and number of optical connectors. In the example of FIGS. 21A and 21B, the output connector housing 180 is configured to receive two LC connectors. However, embodiments are not limited thereto. The output connector housing 180 may be fabricated from a polymer, such as molded thermoset or thermoplastic, filled or unfilled.

Figure 22A:
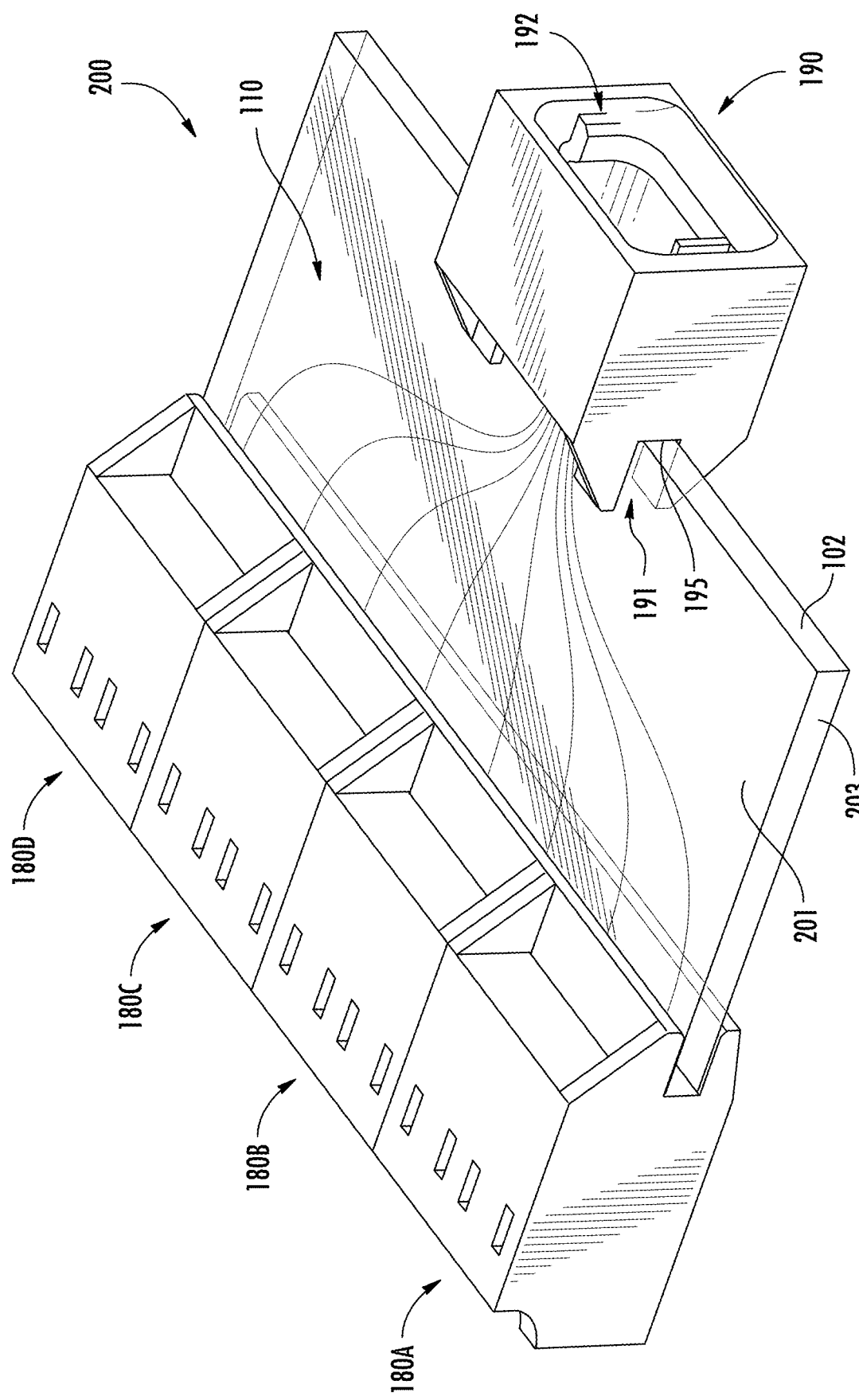
FIGS. 22A and 22B schematically depicts alternative perspective views of an input connector housing and a plurality of output connector housings coupled to a waveguide substrate according to one or more embodiments described and illustrated herein.

Referring particularly to FIG. 21A, the example output connector housing 180 includes an output waveguide substrate slot 181 operable to receive the output edge 204 of a waveguide substrate 200 (see FIG. 22A). The output waveguide substrate slot 181 has an interior wall 185 that includes an output housing alignment feature 182 disposed between two sleeve openings 183. As described in more detail below, the sleeve openings 183 are dimensioned to receive a sleeve 320 and a ferrule 199 of a mated optical connector (see FIG. 23). The output housing alignment feature 182 is configured to be disposed within the output alignment features 218 of the waveguide substrate 200 to provide coarse alignment of the output connector housing 180 to the waveguide substrate 200 and the plurality of waveguides 210 provided therein. The output housing alignment feature 182 may be a protrusion present at the interior wall 185. For example, the output housing alignment feature 182 may be a spherical protrusion, hemispherical protrusion, a half cylindrical protrusion, or any other appropriate protrusion capable of being disposed in the output alignment feature 218 of the waveguide substrate 200.

The output connector housing 180 has two opposing gripping surfaces 187 that grip or otherwise contact the first and second surfaces 201, 203 of the waveguide substrate 200. In some embodiments, the gripping surfaces 187 may include yielding ribs (not shown) to assist in gripping the waveguide substrate 200. The gripping surfaces 187 may be configured to deform slightly as the output connector housing 180 is pushed onto the output edge 204 of the waveguide substrate 200, thus allowing the output connector housing 180 to wrap around the waveguide substrate 200.

FIG. 21B illustrates a rear side of the output connector housing 180 that is similar in construction as a LC duplex adapter body having two connector openings 184 configured to receive two LC optical connectors.

Figure 22B:
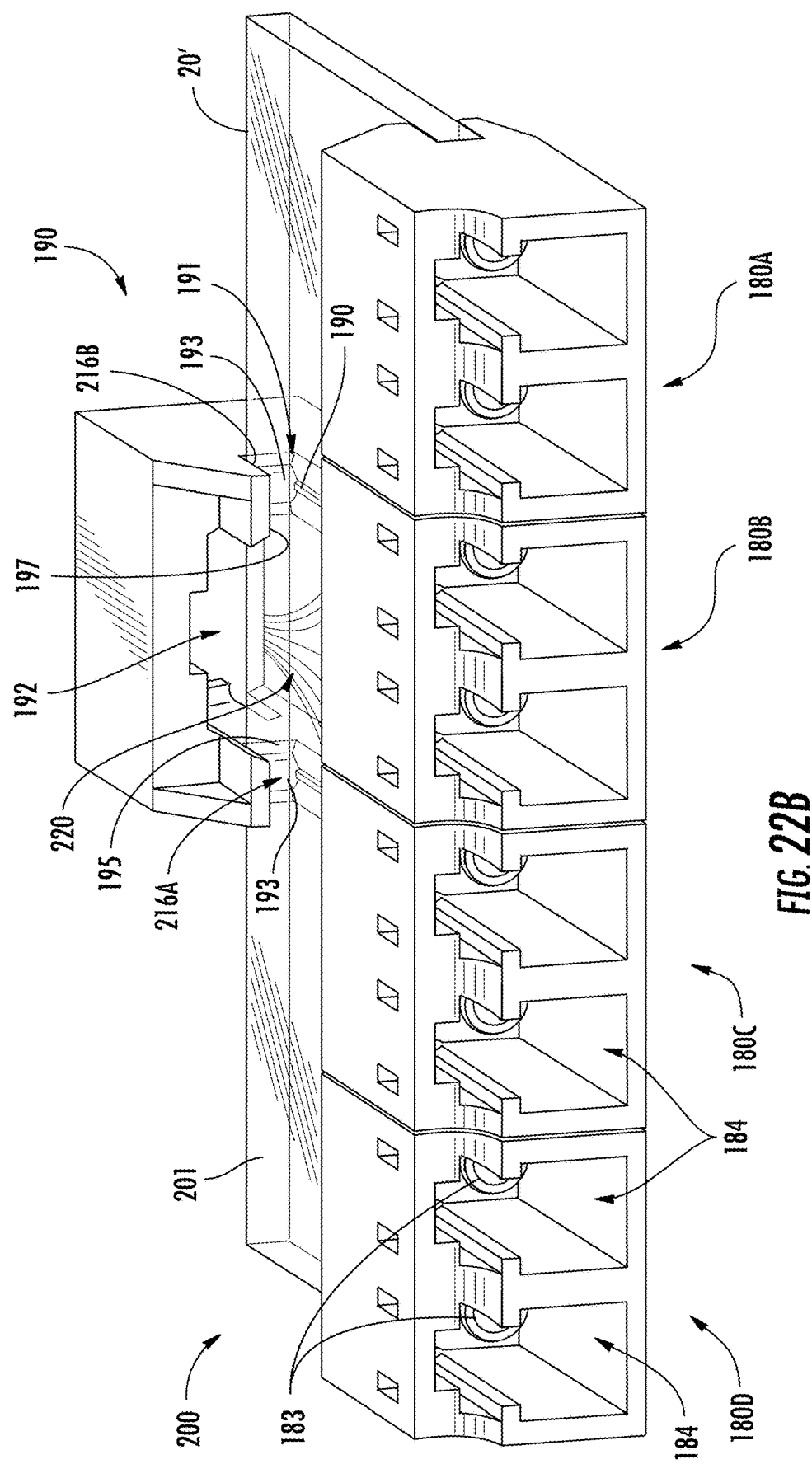
Figure 22C:
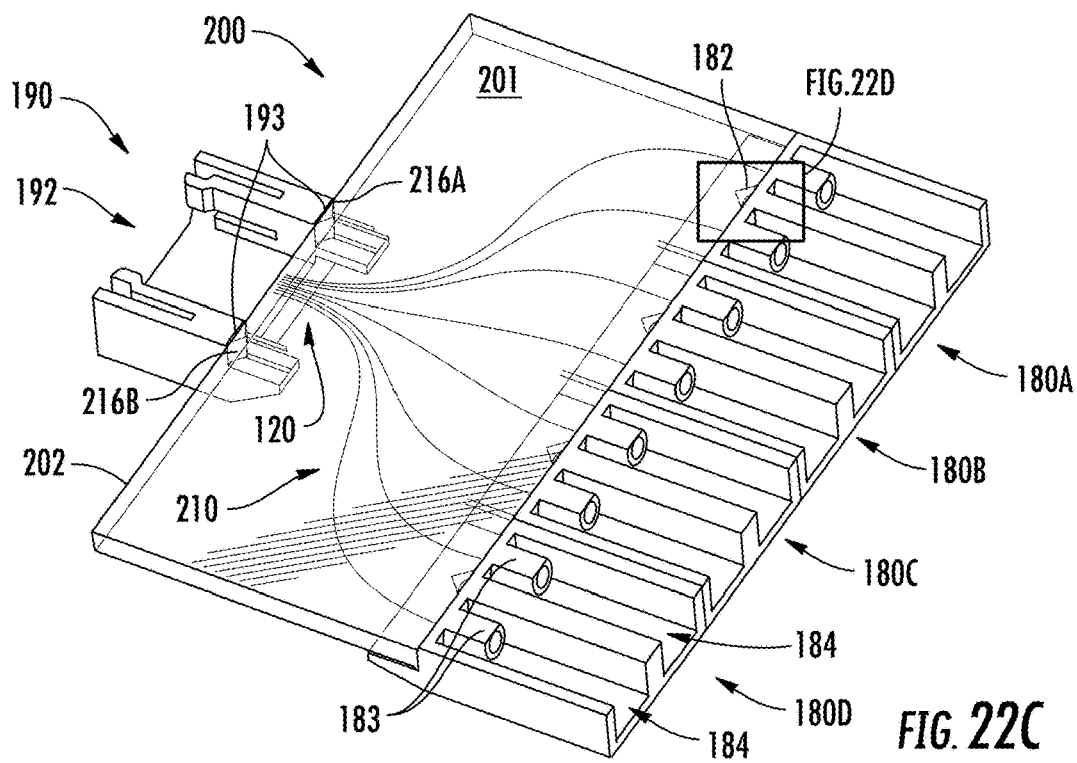
FIG. 22C schematically depicts a cut-away perspective view of the assembly depicted in FIGS. 22A and 22B according to one or more embodiments described and illustrated herein.
Figure 22D:
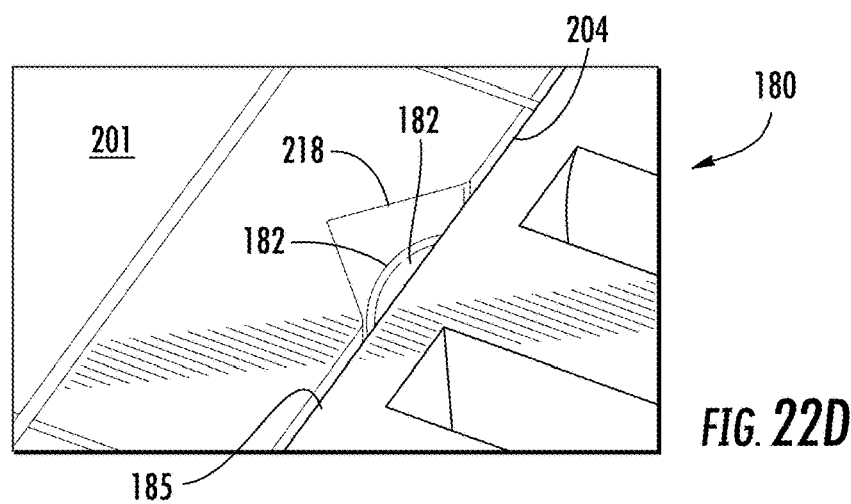
FIG. 22D schematically depicts a close-up cut-away view of a housing alignment feature of an output connector housing disposed within an output alignment feature of the waveguide substrate according to one or more embodiments described and illustrated herein.
Figure 22E:
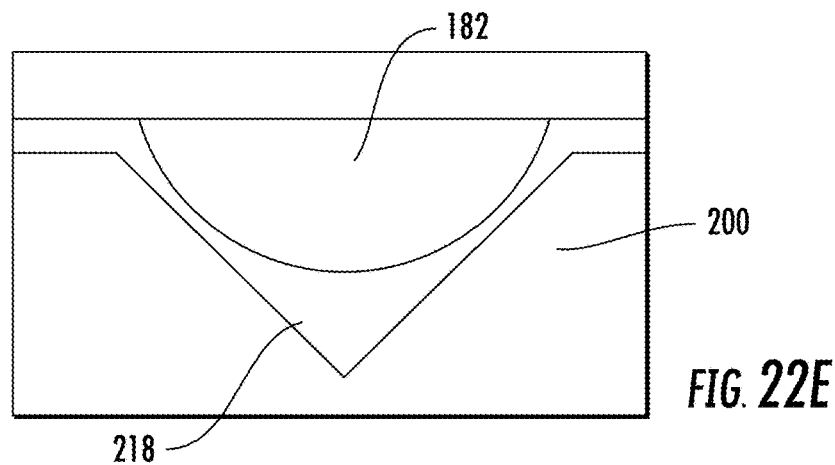
FIG. 22E schematically depicts a side view of a housing alignment feature of an output connector housing disposed within an output alignment feature of the waveguide substrate according to one or more embodiments described and illustrated herein.

FIGS. 22A and 22B schematically illustrate alternative perspective views of a plurality of output connector housing 180A-180D and an input connector housing 190 coupled to a waveguide substrate 200 having a plurality of waveguides 210. FIG. 22C schematically illustrates the assembly of FIGS. 22A and 22B with a top portion of the plurality of output connector housings 180A-180D and a top portion of the input connector housing 190 as cut away. FIG. 22D is a close-up perspective view of an output housing alignment feature 182 disposed within an output alignment feature 118 of the output edge 204 of the waveguide substrate 200. FIG. 22E is an elevation view depicting the output housing alignment feature 182 disposed within the output alignment feature 118 shown in FIG. 22D.

Particularly, FIGS. 22A, 22B and 22C schematically illustrate an example wherein a four output connector housings 180A-180D are ganged and attached to the output edge 204 of the waveguide substrate 200. The number of output connector housings 180 is not limited by this disclosure. Referring specifically to FIGS. 22C-22E, the output housing alignment features 182 of the output connector housings 180 may be disposed within the output alignment features 218 of the waveguide substrate 200 as described above to provide coarse alignment between the four output connector housings 180A-180D and the output edge 204 of the waveguide substrate 200. As an example, and not a limitation, the output connector housings 180A-180D may be adhered to the waveguide substrate 200 by an appropriate adhesive once properly positioned on the output edge 204 of the waveguide substrate 200.

Figure 22F:
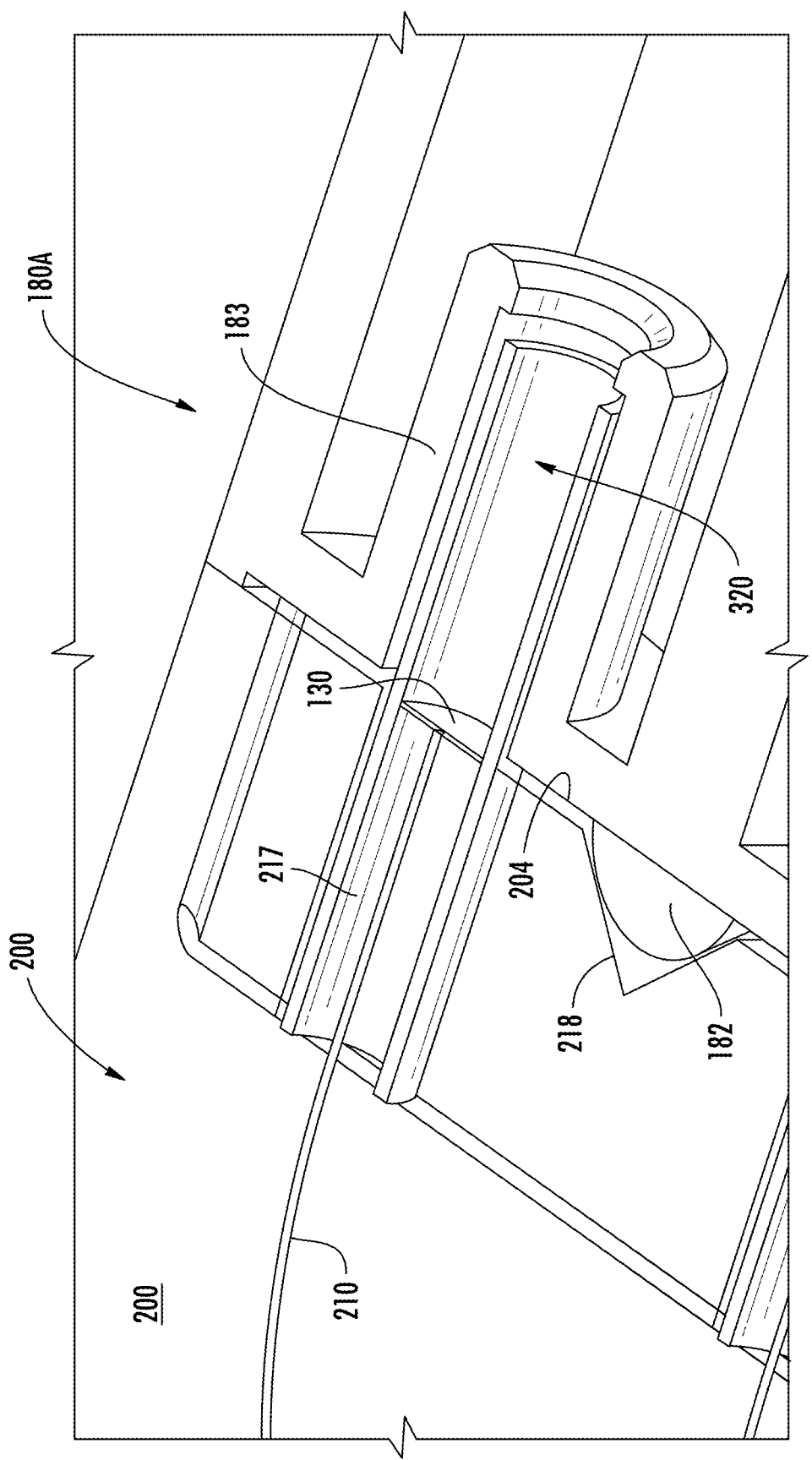
FIG. 22F schematically depicts a close-up cutaway view of a first output connector housing coupled to an output edge 204 of a waveguide substrate according to one or more embodiments described and illustrated herein.

As shown in FIG. 22C, each connector opening 184 of the four output connector housings 180A-180D includes a sleeve opening 183 configured to receive a sleeve 320 as described above. FIG. 22F is a close-up cutaway view of a first output connector housing 180A coupled to the output edge 204 of the waveguide substrate 200 shown in FIGS. 22A-22C. Particularly, a top half of the first output connector housing 180A is cut away to illustrate how an example sleeve 320 (which is also cut away) is disposed within the sleeve opening 183 of the first output connector housing 180A and around the connector ferrule 217 of the waveguide substrate 200. As shown in FIG. 22F, an end of an individual waveguide 210 terminates at an optical coupling interface 130 of the connector ferrule 217.

FIGS. 22A, 22B and 22C also depict an input connector housing 190 coupled to the input edge 202 of the waveguide substrate 200. The input connector housing 190 may be configured to receive any type of optical connector such as, without limitation, an MT-style connector, such as an MTP or an MPO connector including multiple optical fibers. However, the input connector housing 190 may be configured to receive other types of optical connectors. The input connector housing 190 may also be fabricated from a polymer as discussed above with respect to the output connector housing 180, for example. FIG. 22A depicts a perspective view of the example input connector housing 190, which may be configured as a typical MT-style connector adapter or housing comprising an opening 192 configured to receive an MT-style connector. Embodiments are not limited to MT-style connectors, and that the input connector housing 190 may be configured to accept any type of optical connector. As another non-limiting example, the input optical connector may maintain a multi-core optical fiber operable to be optically coupled to a plurality of waveguides within the waveguide substrate.

FIG. 22B schematically depicts a front view of the example input connector housing 190 coupled to an input edge 202 of the waveguide substrate 200. The input connector housing 190 includes an input waveguide substrate slot 191 configured to receive the input edge 202 of the waveguide substrate 200. The input waveguide substrate slot 191 has an interior wall 195 that includes two input housing alignment features 193 disposed on adjacent sides of the opening 192. As best shown in FIG. 22C, the input housing alignment features 193 are configured to be disposed within the input alignment features 216A, 216B of the waveguide substrate 200 to provide coarse alignment of the input connector housing 190 to the waveguide substrate 200 and the plurality of waveguides 210 provided therein. The input housing alignment features 193 may be protrusions present at the interior wall 195. For example, the input housing alignment features 193 may be spherical protrusions, hemispherical protrusions, half cylindrical protrusions, or any other appropriate protrusions capable of being disposed in the input alignment features 216A, 216B of the waveguide substrate 200.

The input connector housing 190 has two opposing gripping surfaces 197 that grip or otherwise contact the first and second surfaces 201, 203 of the waveguide substrate 200. In some embodiments, the gripping surfaces 197 may include yielding ribs (not shown) to assist in gripping the waveguide substrate 200. The gripping surfaces 197 may be configured to deform slightly as the input connector housing 190 is pushed onto the output edge 204 of the waveguide substrate 200, thus allowing the input connector housing 190 to wrap around the waveguide substrate 200. As an example, and not a limitation, the input connector housing 190 may be secured to the input edge 202 of the waveguide substrate 200 by an appropriate adhesive after the input housing alignment features 193 are inserted into the first and second input alignment features 216A, 216B of the waveguide substrate 200.

Figure 23A:
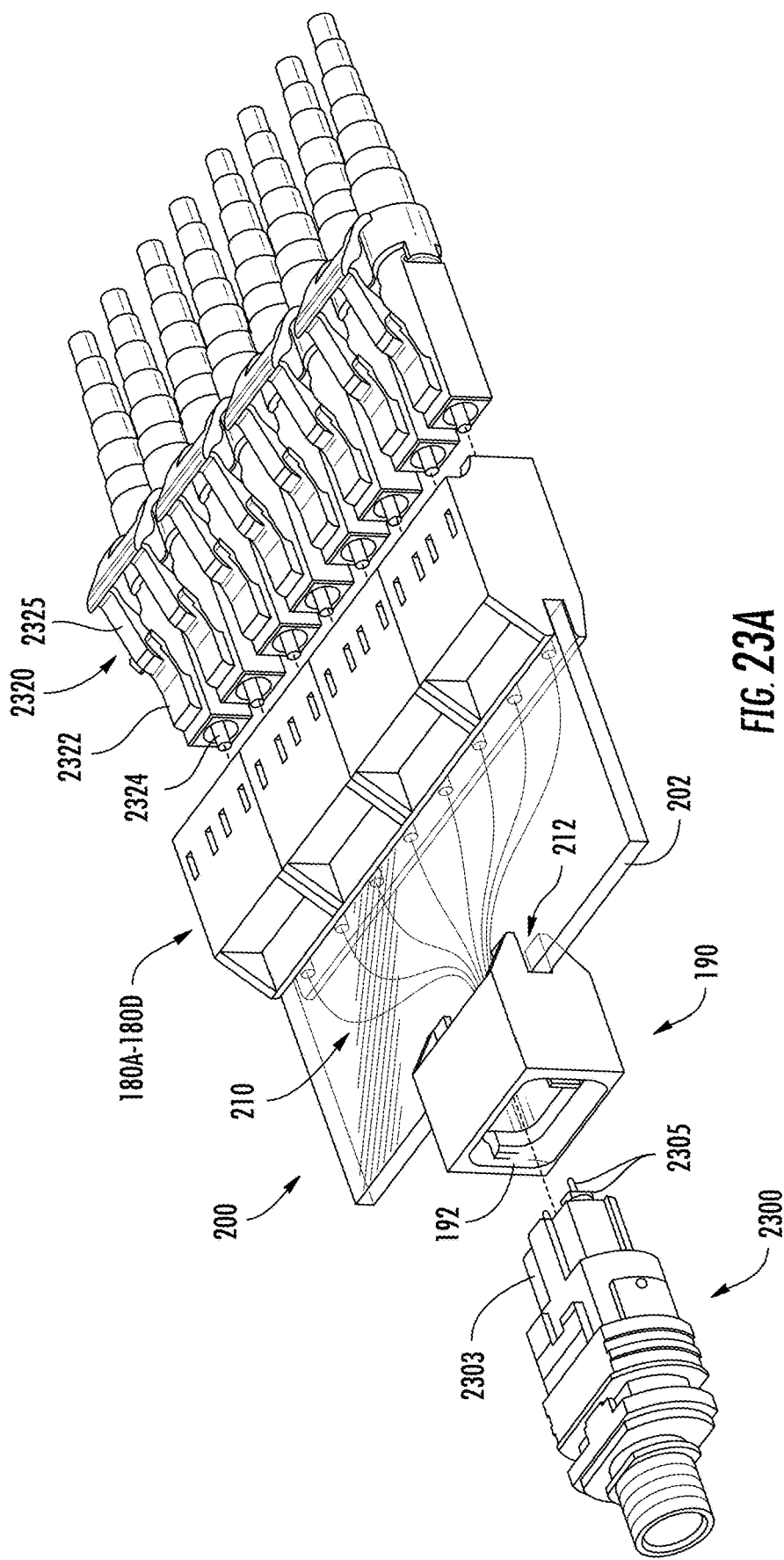
FIGS. 23A and 23B schematically depict alternate perspective views of a waveguide substrate connector assembly, an input optical connector, and a plurality of output optical connectors in an unmated state according to one or more embodiments described and illustrated herein.
Figure 23B:
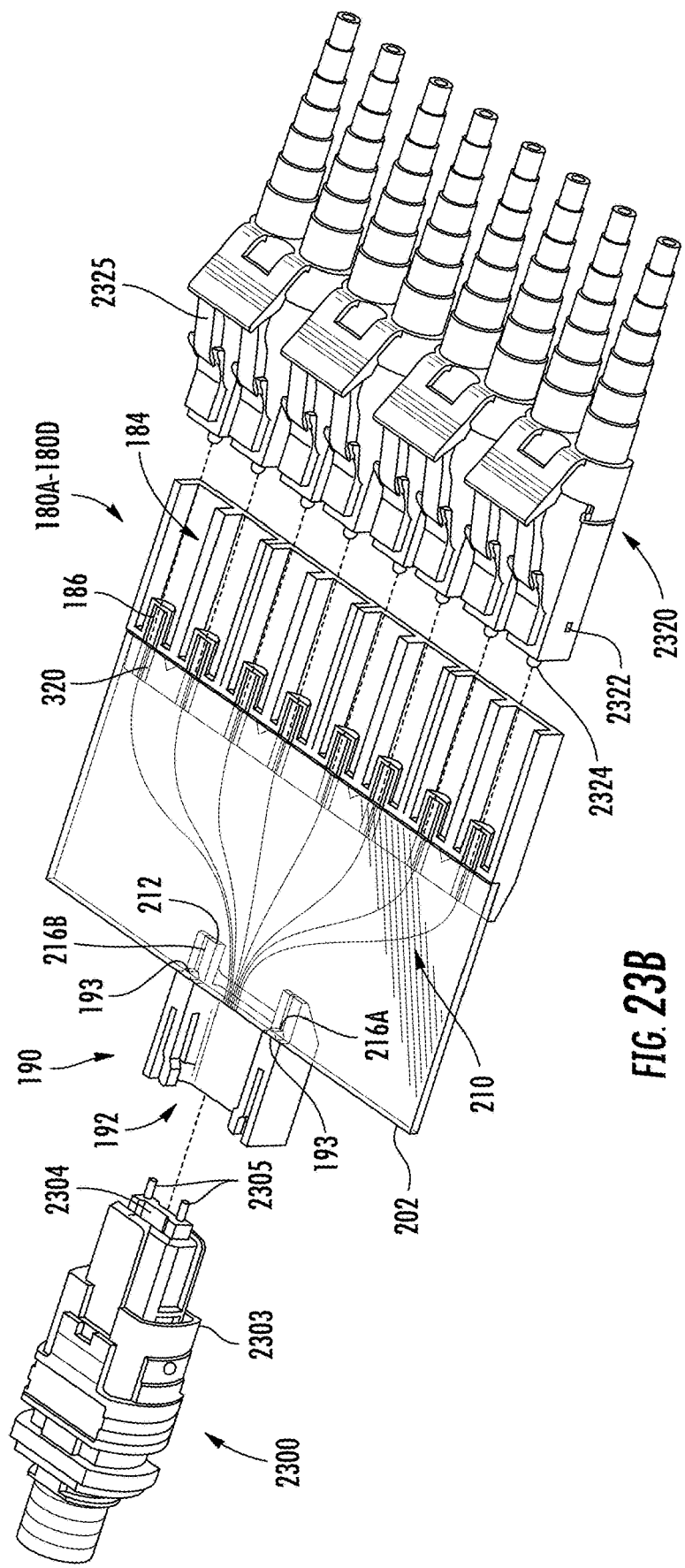
Figure 23C:
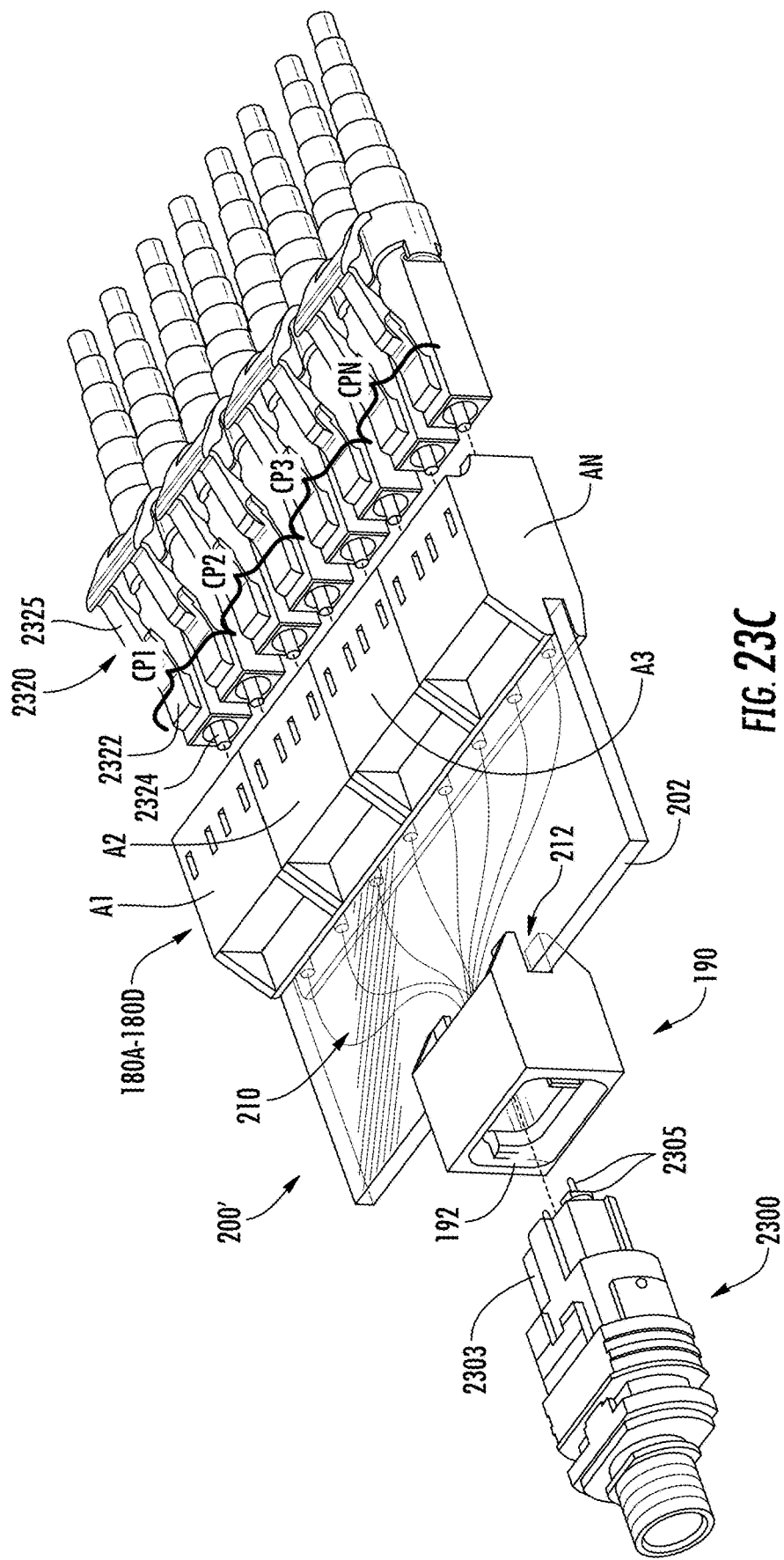
FIG. 23C schematically depicts a perspective view of a waveguide substrate connector assembly using the wiring scheme of FIG. 1A, an input optical connector, and a plurality of output optical connectors in an unmated state according to one or more embodiments described and illustrated herein.
Figure 24:
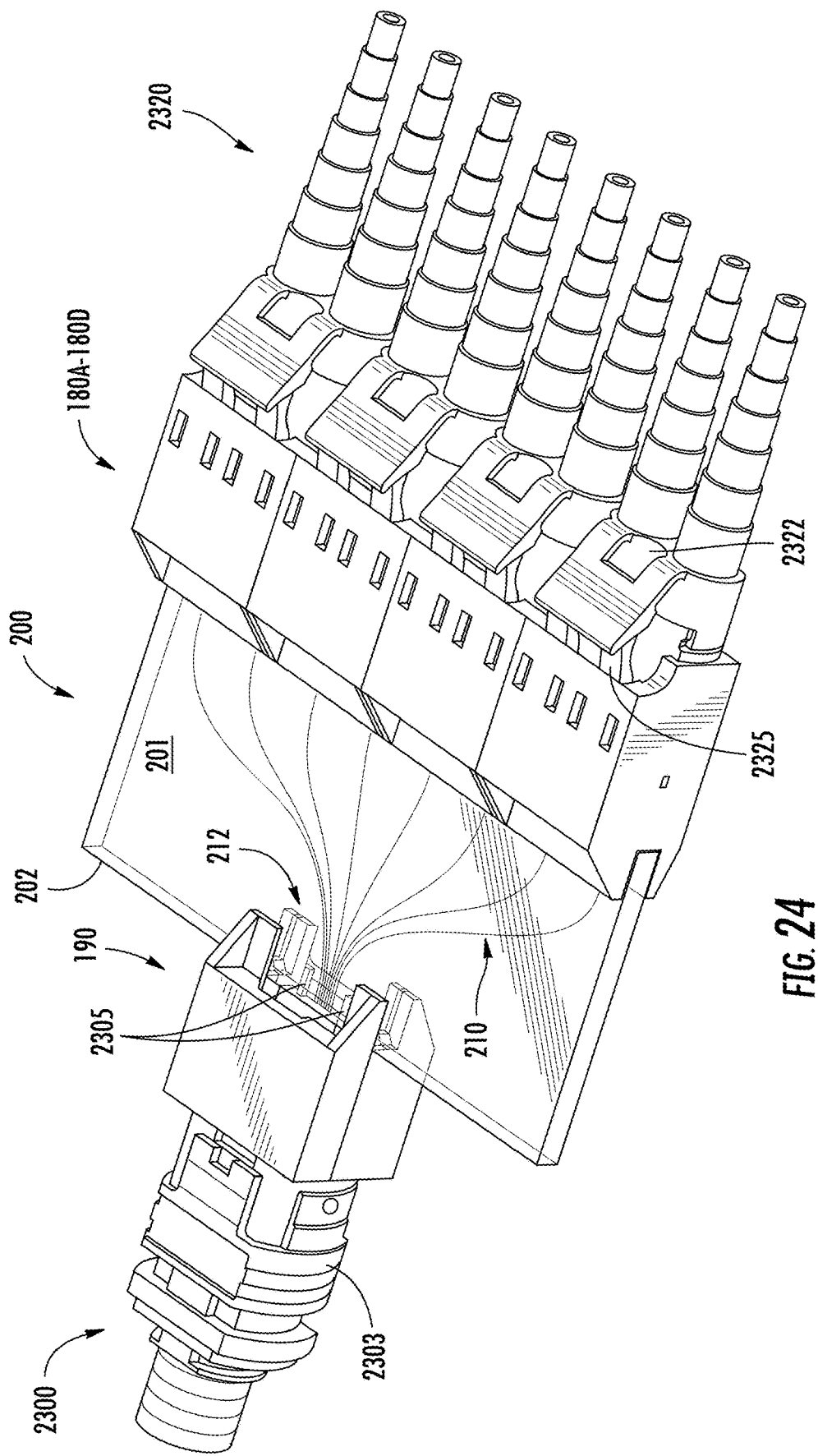
FIG. 24 schematically depicts the waveguide substrate connector assembly, the input optical connector, and the plurality of output optical connectors of FIGS. 23A and 23B in a mated state according to one or more embodiments described and illustrated herein.

FIGS. 23A and 23B schematically depict alternative perspective views of an example input optical connector 2300 and a plurality of output connectors 2320 in an uncoupled state with respect to the input connector housing 190, the waveguide substrate 200, and the four output connector housings 180A-180D. FIG. 23C schematically depicts a perspective view of a waveguide substrate connector assembly using the waveguide substrate 200 and is similar to the embodiment of FIG. 23A. FIG. 24 schematically depicts a perspective view of the example input optical connector 2300, the plurality of output connectors 2320, the input connector housing 190, the waveguide substrate, 200, and the four output connector housings 180A-180D of FIGS. 23A and 23B in a coupled state.

Referring to FIGS. 23A, 23B, 23C and 24, the input optical connector 2300 is illustrated as an MT-style connector associated with an optical cable (not shown) having a plurality of optical fibers (not shown). However, embodiments are not limited by the input optical connector 2300 shown in FIG. 23B. The example input optical connector 2300 includes an input housing 2303, a multi-fiber input ferrule 2304, and two connector alignment pins 2305. The input housing 2303 surrounds the multi-fiber input ferrule 2304, and the two connector alignment pins 2305 extend from a coupling face of the multi-fiber input ferrule 2304. The input optical connector 2300 is mated to the input connector housing 190 such that the input housing 2303 is inserted into the opening 192 of the input connector housing 190, and the two connector alignment pins 2305 are disposed within the first and second pin bores 213A, 213B at the input edge 202 of the waveguide substrate 200 to align the plurality of optical fibers within the multi-fiber input ferrule 2304 with the plurality of waveguides 210 at an input 212 present at the input edge 202. Engagement or other mechanical features (now shown, e.g., arms, latches, magnets, etc.) may be provided on one or more of the input housing 2303 and the input connector housing 190 to retain the input optical connector 2300 within the input connector housing 190.

In the illustrated embodiment of FIGS. 23A, 23B, 23C and 24, the plurality of output optical connectors 2320 is configured as individual LC-type optical connectors each maintaining a single optical fiber (now shown) within a ferrule 2324 that is disposed within an output housing 2322. The output housings 2322 of the output optical connectors 2320 are operable to be positioned within the connector openings 184 of the duplex output optical connector housings 180A-180D. The output housing 2322 may comprise a latching arm 2325 configured to releasably engage one or more features of the output optical connector housings 180A-180D. For example, the latching arm 2325 may engage a corresponding engagement recess 189 (see FIG. 21B) to lock the output optical connector 2320 to the output connector housing 180. The output optical connector 2320 may be released from the output connector housing 180 by pressing down on the latching arm 2325 and pulling the output optical connector 2320 back.

Figure 25:
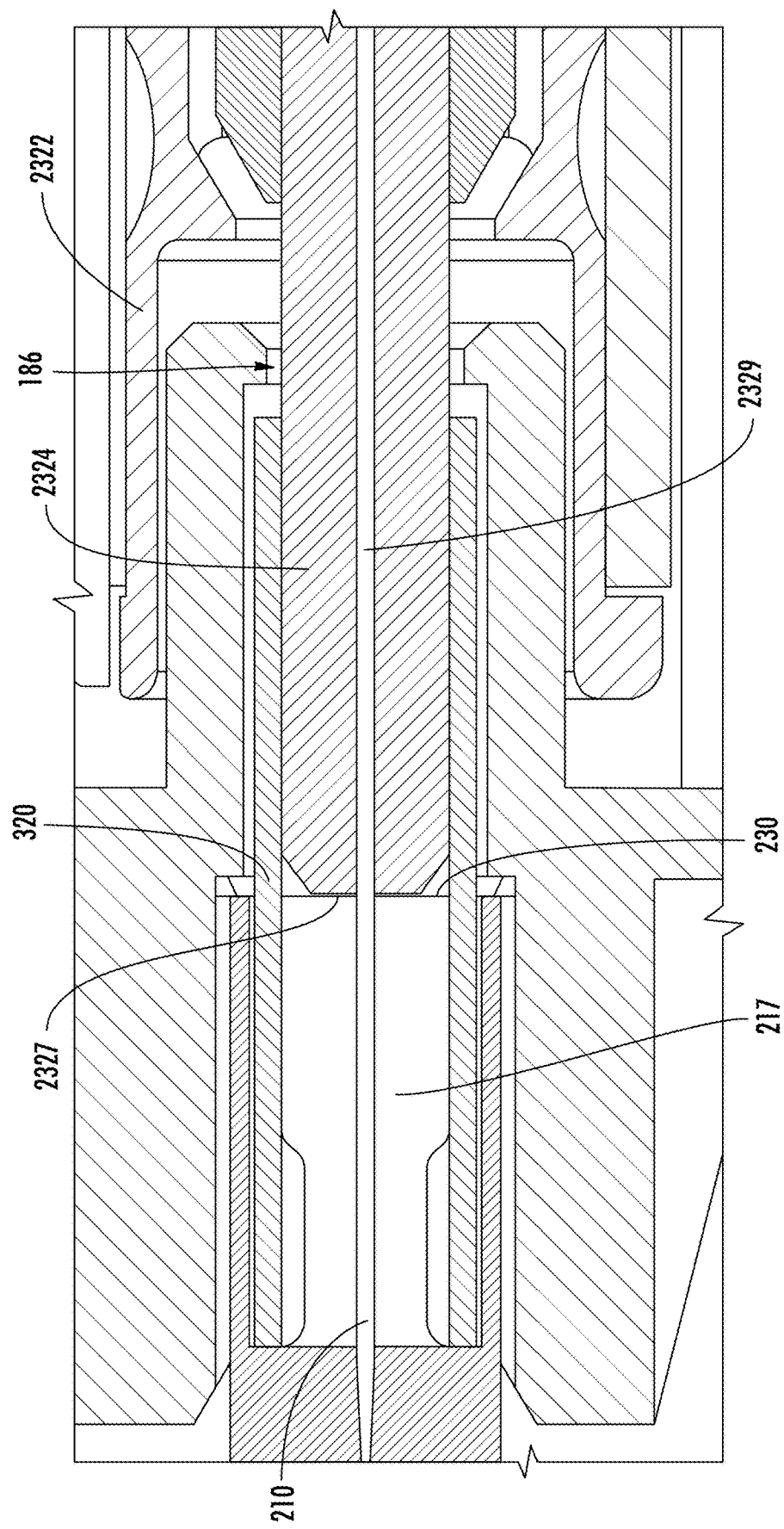
FIG. 25 schematically depicts a cross sectional view of an example output optical connector mated to an example connector ferrule of an example waveguide substrate according to one or more embodiments described and illustrated herein.

When an output optical connector 2320 is mated with an output connector housing 180, the ferrule 2324 is disposed within a sleeve 320 and the sleeve opening 186 within the connector opening 184. FIG. 25 is a close-up cross-sectional view of the mating between a connector ferrule 217 of the waveguide substrate 200 and the ferrule 2324 of the output optical connector 2320. As stated above, when an output optical connector 2320 is inserted into a connector opening 184 of an output connector housing 180, the ferrule 2324 is positioned within the sleeve opening 186 and the sleeve 320 such that a mating face 2327 contacts or nearly contacts the connector ferrule 217 of the waveguide substrate 200, which is also disposed within the sleeve 320. The optical fiber 2329 within the ferrule 2324 is substantially aligned, and optical coupled to, the waveguide 210 within the connector ferrule 217 and at the optical coupling interface 230.

It should now be understood that embodiments of the present disclosure are directed to waveguide substrates, waveguide substrate connector assemblies and methods of fabricating waveguide substrates having integrated waveguides and alignment and/or engagement features for providing optical connections. Integration of connector ferrules, bores and other features into the waveguide substrate allows the size of the waveguide substrate to be reduced, enabling more compact packaging solutions for other components. Laser-damage-and-etch processes for connector ferrules, guide pin bores and other features are suitable for conditions where the connector ferrule and guide pin diameters are greater than the waveguide substrate thickness. This increases the variety of connectors that can be integrated into the waveguide substrate. Additionally, integration of vertical slots into connector ferrule and hole features enhance the flow of acid etchants, reducing processing time.

Integration of precision ferrules into the waveguide substrate can reduce cost by eliminating the need for ceramic ferrules and possibly sleeve components. Sleeves with tabs enable a robust mechanical attachment to waveguide substrate that helps protect the glass connector sleeve from damage during connector mating and demating. Features on the connector ferrule end face can make the connector more tolerant of dust and debris. The connector ferrules are self-aligned to waveguides by forming both elements on a common laser bench, simplifying the connector design on the substrate side.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:
1. A waveguide substrate comprising:
   a first surface and a second surface opposite the first surface;
   an input edge and an output edge;
   at least one waveguide within the waveguide substrate extending from the input edge to the output edge such that an input end of the at least one waveguide is at the input edge and an output end of the at least one waveguide is at the output edge;
   at least one input alignment feature within the input edge adjacent to the input end of the at least one waveguide;
   at least one output alignment feature within the output edge adjacent to the output end of the at least one waveguide, wherein each of the at least one input alignment feature and the at least one output alignment feature is a notch within the input edge and the output edge, respectively, between the first surface and the second surface;
   a first slit opening extending through the waveguide substrate and adjacent to the at least one waveguide at the output edge; and
   a second slit opening extending through the waveguide substrate at the output edge, wherein the second slit opening is offset from the first slit opening such that the first slit opening and the second slit opening define a connector ferrule at the output edge configured to mate with a corresponding connector ferrule of an optical connector, and the at least one waveguide is disposed within the connector ferrule,
   wherein the first slit opening and the second slit opening are curved defining a diameter corresponding to the corresponding connector ferrule and the first slit opening and the second slit opening are configured to receive a cylindrical sleeve that at least partially surrounds the connector ferrule.

2. The waveguide substrate of claim 1, wherein the waveguide substrate is glass.

3. The waveguide substrate of claim 1, wherein the notch is a v-groove.

4. The waveguide substrate of claim 1, wherein the at least one waveguide comprises a plurality of waveguides.

5. The waveguide substrate of claim 4, wherein a pitch of the plurality of waveguides at the input edge is smaller than a pitch of the plurality of waveguides at the output edge.

6. The waveguide substrate of claim 4, wherein:
   the at least one input alignment feature comprises a first input alignment feature and a second input alignment feature such that input ends of the plurality of waveguides are disposed between the first input alignment feature and the second input alignment feature; and
   the at least one output alignment feature comprises a plurality of output alignment features such that individual output alignment features of the plurality of output alignment features are disposed between individual output ends of the plurality of waveguides.

7. The waveguide substrate of claim 1, wherein an end of the connector ferrule comprises a chamfered perimeter.

8. The waveguide substrate of claim 1, wherein an engagement face of the connector ferrule comprises a raised feature surrounding the output end of the at least one waveguide.

9. The waveguide substrate of claim 1, wherein an engagement face of the connector ferrule comprises ring recess surrounding the output end of the at least one waveguide.

10. The waveguide substrate of claim 1, wherein each of the first slit opening and the second slit opening comprises an enlarged vertical channel extending between the first surface and the second surface.

11. The waveguide substrate of claim 1, further comprising at least one engagement depression disposed on at least one of the first surface of the waveguide substrate and the second surface of the waveguide substrate.

12. The waveguide substrate of claim 11, wherein:
   the at least one engagement depression comprises a first engagement depression adjacent a first side of the connector ferrule and a second engagement depression adjacent a second side of the connector ferrule;
   the first engagement depression is disposed on at least one of the first surface and the second surface; and
   the second engagement depression is disposed on at least one of the first surface and the second surface.

13. The waveguide substrate of claim 12, further comprising:
   a first guide taper extending from the output edge to the first engagement depression; and
   a second guide taper extending from the output edge to the second engagement depression.

14. The waveguide substrate of claim 1, further comprising at least one tapered vertical slot provided one or more of the input edge and the output edge, wherein the tapered vertical slot is orthogonal to the first surface and the second surface.

15. The waveguide substrate of claim 14, wherein each of the at least one input alignment feature and the at least one output alignment feature further comprises a vertical channel at an end of the tapered vertical slot that is opposite the input edge or the output edge, wherein the vertical channel is orthogonal to the first surface and the second surface.

16. The waveguide substrate of claim 1, further comprising at least one cavity at the output edge, wherein the at least one cavity define an optical coupling surface that is offset from the output edge, and the output end of the at least one waveguide is at the optical coupling surface.

17. The waveguide substrate of claim 1, further comprising:
   an optical coupling surface proximate the output edge;
   a first sleeve arm extending from a first side of the optical coupling surface to the output edge; and
   a second sleeve arm extending from a second side of the optical coupling surface to the output edge.

18. The waveguide substrate of claim 1, further comprising:
- a connector ferrule comprising an optical coupling surface, wherein the output end of the at least one waveguide is at the optical coupling surface;
- a first sleeve arm adjacent a first side of the connector ferrule; and
- a second sleeve arm adjacent a second side of the connector ferrule.

19. The waveguide substrate of claim 18, wherein the optical coupling surface is offset from the output edge of the waveguide substrate.

* * * * *